(12) United States Patent
Ehara et al.

(10) Patent No.: US 12,485,787 B2
(45) Date of Patent: Dec. 2, 2025

(54) SERVER

(71) Applicant: TOYOTA JIDOSHA KABUSHIKI KAISHA, Toyota (JP)

(72) Inventors: Masato Ehara, Gotemba (JP); Daiki Yokoyama, Gotemba (JP); Yuki Takahashi, Susono (JP); Tomoya Takahashi, Ebina (JP); Tomoyuki Kubota, Susono (JP); Sachio Toyora, Gotemba (JP); Keisuke Fukuoka, Fujieda (JP); Zidan Xu, Yokohama (JP); Wenfeng Liang, Yokohama (JP); Hiroki Murata, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 694 days.

(21) Appl. No.: 18/050,575

(22) Filed: Oct. 28, 2022

(65) Prior Publication Data

US 2023/0219443 A1 Jul. 13, 2023

(30) Foreign Application Priority Data

Jan. 7, 2022 (JP) ................. 2022-001617

(51) Int. Cl.
*B60L 53/62* (2019.01)
*B60L 53/126* (2019.01)
*B60L 53/30* (2019.01)

(52) U.S. Cl.
CPC ............. *B60L 53/62* (2019.02); *B60L 53/126* (2019.02); *B60L 53/305* (2019.02)

(58) Field of Classification Search
CPC ....... B60L 53/62; B60L 53/126; B60L 53/305
See application file for complete search history.

(56) References Cited

U.S. PATENT DOCUMENTS

| 7,991,665 | B2 * | 8/2011 | Hafner | .................... B60L 53/64 |
|---|---|---|---|---|
| | | | | 705/35 |
| 9,371,007 | B1 * | 6/2016 | Penilla | ............... G06Q 30/0259 |
| 11,987,146 | B2 * | 5/2024 | Tsuchiya | ................ H02J 3/322 |
| 2009/0313104 | A1 * | 12/2009 | Hafner | ................... G06Q 20/10 |
| | | | | 705/14.25 |

FOREIGN PATENT DOCUMENTS

JP 2015-095983 A 5/2015

\* cited by examiner

*Primary Examiner* — Richard V Muralidar
(74) *Attorney, Agent, or Firm* — Finnegan, Henderson, Farabow, Garrett and Dunner, LLP

(57) ABSTRACT

A server includes a processor and a communication device configured to acquire a transmitted power amount transmitted from a power facility during external charging of a vehicle participating in a DR. The processor is configured to calculate, when a plurality of vehicles participates in the DR, a standard reward that is a standard of a reward given from an aggregator to each of the vehicles, according to the transmitted power amount, decide, when a first vehicle participates in the DR, a first reward that is a reward given from the aggregator to the first vehicle, such that the first reward becomes the standard reward for the first vehicle, and decide, when a second vehicle participates in the DR, a second reward that is a reward given from the aggregator to the second vehicle, such that the second reward becomes higher than the standard reward for the second vehicle.

7 Claims, 16 Drawing Sheets

COMPARISON EXAMPLE

| 650 | PERIOD | | |
|---|---|---|---|
| | P1 | P2 | ... |
| ADJUSTMENT REQUEST POWER AMOUNT ARP | TP1 | TP2 | |
| ADJUSTMENT REWARD AR | TPR1 | TPR2 | |
| ADJUSTMENT REWARD UNIT PRICE ARUP | upr1 | upr2 | |
| TOTAL REWARD AMOUNT (TOTAL DISTRIBUTION AMOUNT) TRA | TDP1 | TDP2 | |
| ADJUSTMENT PROFIT APR (= AR − TRA) | PPR1 | PPR2 | |

| 670 | PERIOD | | |
|---|---|---|---|
| | P1 | P2 | ... |
| POWER COST UNIT PRICE UPRP | uprp1 | uprp2 | |

| 665 | | PERIOD | | |
|---|---|---|---|---|
| RESOURCE ID | METHOD OF EXTERNAL CHARGING | P1 | P2 | ... |
| R1 (50A) | WIRED/WIRELESS | POSSIBLE (WIRED) | POSSIBLE (WIRED) | |
| R2 (50B) | WIRED/WIRELESS | POSSIBLE (WIRELESS) | POSSIBLE (WIRELESS) | |
| R3 | WIRED | POSSIBLE (WIRED) | IMPOSSIBLE | |
| R4 | WIRED | IMPOSSIBLE | POSSIBLE (WIRED) | |
| ... | ... | | | |

| 666 | | PERIOD | | |
|---|---|---|---|---|
| FACILITY ID | | P1 | P2 | ... |
| PE1 (40) | TRANSMITTED POWER AMOUNT PT1(PT) | a1 | a2 | ... |
| | POWER TRANSMISSION METHOD | WIRED | WIRED | ... |
| PE2 (45) | TRANSMITTED POWER AMOUNT PT2(PT) | b1 | b2 | ... |
| | POWER TRANSMISSION METHOD | WIRELESS | WIRELESS | ... |
| ... | ... | ... | ... | ... |

| 668 | | PERIOD | | |
|---|---|---|---|---|
| RESOURCE ID | | P1 | P2 | ... |
| R1 (50A) | DR REWARD UNIT PRICE UPRR1 | uprA1 | uprB2 | ... |
| | DR REWARD RWA | PrA1 | PrA2 | ... |
| R2 (50B) | DR REWARD UNIT PRICE UPRR2 | uprB1 | uprB2 | ... |
| | DR REWARD RWB | prB1 | prB2 | ... |
| ... | | ... | ... | ... |

SERVER

CROSS-REFERENCE TO RELATED APPLICATION

This application claims priority to Japanese Patent Application No. 2022-001617 filed on Jan. 7, 2022, incorporated herein by reference in its entirety.

BACKGROUND

1. Technical Field

The present disclosure relates to a server.

2. Description of Related Art

Japanese Unexamined Patent Application Publication No. 2015-95983 discloses a battery electric vehicle. The battery electric vehicle is configured to be capable of charging its battery with power supplied from a power facility connected to a commercial power source via a power cable (wired charging). The battery electric vehicle is also configured to be capable of charging its battery by receiving power supplied from a charging/discharging facility in a wireless manner without the power cable (wireless charging).

SUMMARY

In a virtual power plant (VPP), a server of an aggregator uses a demand response (DR) to adjust a power supply and demand balance. The DR is a mechanism that requests a power resource of a consumer to change (for example, increase) a power demand.

A vehicle having a power accumulation device mounted thereon may be used as the power resource. When a plurality of vehicles participates in the DR, a situation is assumed in which one vehicle (a first vehicle) participates in the DR by executing wired charging, but another vehicle (a second vehicle) participates in the DR by executing wireless charging.

Power loss that occurs during the execution of the wireless charging is generally larger than power loss that occurs during the execution of the wired charging. Therefore, a power amount accumulated in a power accumulation device of the second vehicle due to the DR may be smaller than a power amount accumulated in a power accumulation device of the first vehicle. For this reason, the second vehicle may need to execute extra wireless charging. In this case, an extra power rate will be charged to the second vehicle due to the wireless charging.

As a result, the second vehicle may suffer a disadvantage as compared with the first vehicle. Decreasing of the number of second vehicles participating in the DR due to the disadvantage, is not desirable in terms of adjusting the power supply and demand balance.

The present disclosure provides a server that contributes to an adjustment of a power supply and demand balance by restricting the number of vehicles participating in DR due to wireless charging from being decreased.

A server according to one aspect of the present disclosure is a server of an aggregator configured to request a plurality of vehicles to participate in a demand response (DR). Each of the vehicles is equipped with a power accumulation device and configured to be electrically connectable to a power system. The server includes a communication device and a processor. The communication device is configured to acquire a transmitted power amount that is transmitted from a power facility during external charging of a vehicle participating in the DR. The processor is configured to calculate, when the vehicles configured to participate in the DR by executing the external charging participate in the DR, a standard reward that is a standard of a reward given from the aggregator to each of the vehicles, according to the transmitted power amount, to decide, when a first vehicle from among the vehicles participates in the DR, a first reward that is a reward given from the aggregator to the first vehicle, such that the first reward becomes the standard reward for the first vehicle, and to decide, when a second vehicle from among the vehicles participates in the DR, a second reward that is a reward given from the aggregator to the second vehicle, such that the second reward becomes higher than a standard reward for the second vehicle. The external charging is charging of the power accumulation device using power from the power facility connected to the power system. The first vehicle is configured to execute wired charging that is the external charging using power received via a power cable of a first power facility as the power facility. The second vehicle is configured to execute wireless charging that is the external charging using power received from a second power facility as a power facility in a wireless manner.

With the above aspect of the present disclosure, it is possible to contribute to an adjustment of a power supply and demand balance by restricting the number of vehicles participating in DR due to wireless charging from being decreased.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a diagram illustrating an example of data stored in a storage device of a server;

DETAILED DESCRIPTION OF EMBODIMENTS

Figure 1:
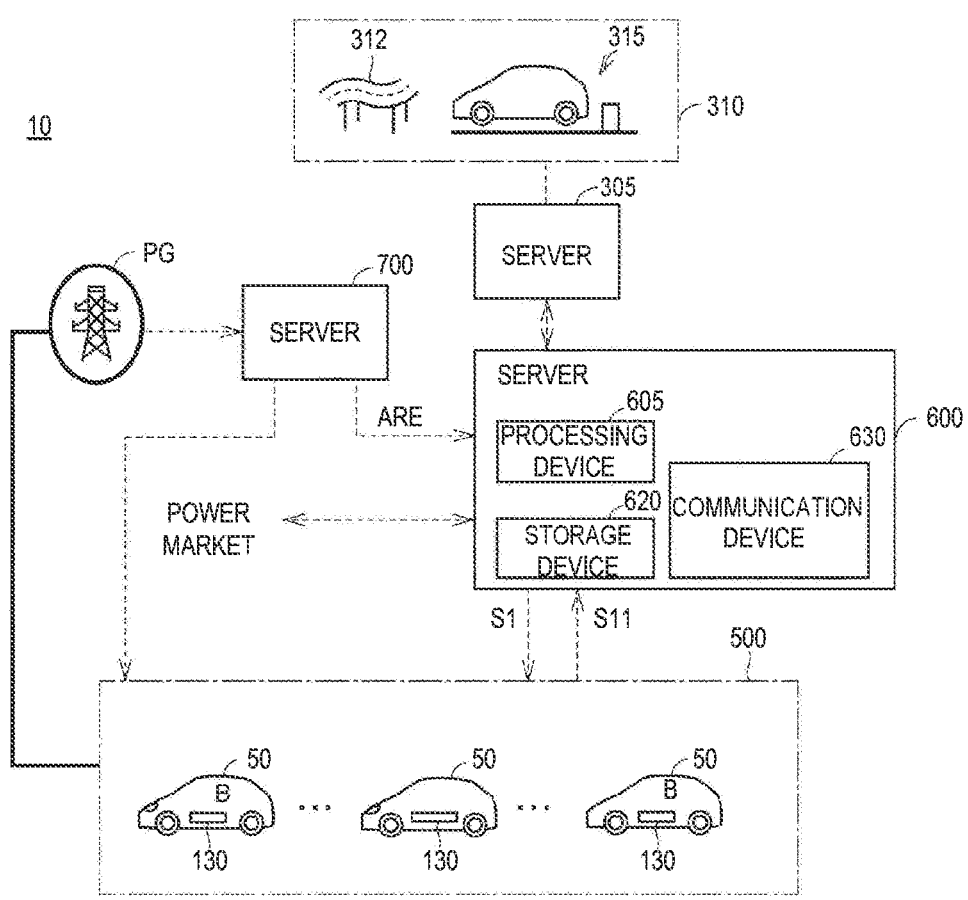
FIG. 1 is a diagram illustrating a schematic configuration of a power management system according to the present embodiment.

Hereinafter, embodiments of the present disclosure will be described in detail with reference to drawings. In the drawings, the same or corresponding parts are denoted by the same reference signs and description thereof will not be repeated.

First Embodiment

FIG. 1 is a diagram illustrating a schematic configuration of a power management system according to the present embodiment. With reference to FIG. 1, a power management system 10 includes a power system PG, a server 305, a power resource group 500, a server 600, and a server 700.

The power system PG is composed of a power transmission/distribution facility. The power system PG is maintained and managed by a power company that is its operator.

The server 305 is operated by a business operator who manages a paid infrastructure 310 for vehicles. The paid infrastructure 310 for vehicles may be, for example, an expressway 312 or a parking lot 315. When a vehicle uses the paid infrastructure 310, the server 305 charges a user of the vehicle for a usage fee of the paid infrastructure 310.

The power resource group 500 includes a plurality of vehicles 50 each of which has a battery 130 mounted thereon. Each vehicle 50 is a battery electric vehicle (BEV) configured to be electrically connectable to the power system PG, and functioning as a distribution-type power source.

Each vehicle 50 is configured to be capable of executing external charging for charging the battery 130 with power from a power facility provided outside the vehicle.

When each vehicle 50 executes the external charging, power is supplied from the power system PG to each vehicle 50, and thus a power load in the power system PG is increased. For this reason, each vehicle 50 can contribute to an adjustment (participating in a demand response (DR)) of the power load by executing the external charging. When each vehicle 50 participates in the DR, it can obtain a reward from the aggregator according to a degree of contribution to a power supply and demand balance in the power system PG.

When the vehicle 50 participates in "upper DR" for requesting the vehicle 50 to increase a charged power amount in the external charging, power demand in the power system PG can be increased by the increased power amount. The upper DR is executed when power supply in the power system PG is larger than the power demand.

On the other hand, when the vehicle 50 participates in "lower DR" for requesting the vehicle 50 to decrease (conserve) a charged power amount in the external charging, power demand in the power system PG is decreased by the decreased charged power amount. The lower DR is executed when the power demand in the power system PG is larger than the power supply. In this case, power may be supplied to the power system PG through a power facility 45 by an external power supply (described below) of the vehicle 50.

The server 600 belongs to the aggregator and is configured to manage the power resource group 500. The aggregator is an electricity company that delivers power to the power system PG using the power resource group 500, or that increases or decreases the power load in the power system PG. As such, the aggregator can obtain a reward from the power company.

The server 600 includes a processing device 605, a storage device 620, and a communication device 630. The processing device 605 includes a processor, such as a central processing unit (CPU), and a memory, such as a read-only memory (ROM) and a random access memory (RAM). The storage device 620 stores, for example, a program executed by the processing device 605, and various pieces of information and data used by the processing device 605. The communication device 630 is one of various communication interfaces.

The server 600 receives an adjustment request ARE for the power supply and demand balance in the power system PG from the server 700 (described below). The adjustment request ARE includes a prediction result of which is larger between the power demand and the power supply in a target time range. Upon receiving the adjustment request ARE, the server 600 requests the vehicle 50 to participate in the DR. Specifically, the server 600 sends a DR signal S1 to each vehicle 50.

The DR signal S1 is a signal for requesting the vehicle 50 to participate in the lower DR or the upper DR. The DR signal S1 includes a type of DR (whether it is the upper DR or the lower DR) and a period (a DR period) in which the vehicle 50 is requested to participate in the DR. The DR signal S1 further includes information indicating a power amount (a transmitted power amount transmitted from the power facility connected to the power system PG to the vehicle 50, and the like) exchanged between the vehicle 50 and the power system PG during the DR period, and a reward (a DR reward) paid from the aggregator to a user of the vehicle 50 for participating in the DR.

The server 600 is configured to receive an approval signal S11 from the vehicle 50. When the participation of the vehicle 50 in the DR is approved by the user of the vehicle 50, the approval signal S11 is sent from the vehicle 50 to the server 600.

When the server 600 receives the approval signal S11, a contract is established between the user of the vehicle 50 and the aggregator. The contract includes information indicating the DR period, the type of DR, an exchanged power amount during the DR period, and the DR reward. Contract information indicating the contents of the contract are included in the approval signal S11 and is stored in a storage device of the vehicle 50 and the storage device 620 of the server 600.

The server 700 is a computer belonging to the power company, and is configured to be capable of communicating with the server 600. The server 700 predicts the power supply and demand balance in the power system PG for each period (time range), and outputs the adjustment request ARE of the power supply and demand balance to the server 600 according to a prediction result.

Figure 2:
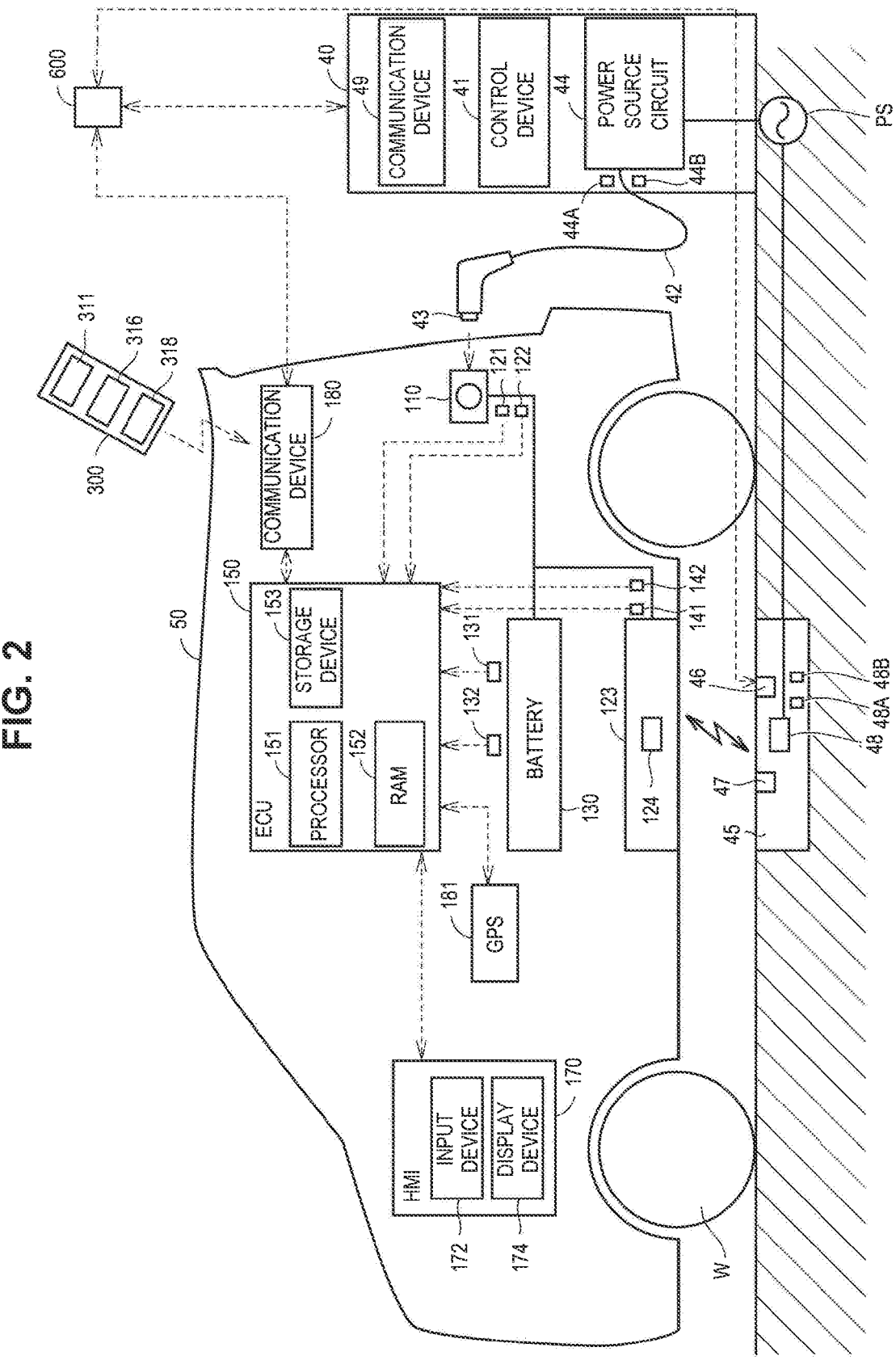
FIG. 2 is a diagram illustrating a configuration of a vehicle.

FIG. 2 is a diagram illustrating a configuration of the vehicle 50. With reference to FIG. 2, the vehicle 50 includes an inlet 110, voltage sensors 121, 131, 141, and current sensors 122, 132, 142. The vehicle 50 further includes a power reception device 123, a battery 130, an HMI device 170, a communication device 180, a global positioning system (GPS) receiver 181, and an ECU 150.

The inlet 110 is configured to receive power from a power stand 40 (described below). The voltage sensor 121 detects voltage of power received by the inlet 110. The current sensor 122 detects current of power received by the inlet 110.

The power reception device 123 can receive power from the power facility 45 (described below) in a wireless manner or transmit power to the power facility 45 in a wireless manner. The power reception device 123 includes a coil 124.

The voltage sensor 141 detects voltage of power received or transmitted by the power reception device 123. The current sensor 142 detects current of power received or transmitted by the power reception device 123.

The battery 130 is a secondary battery, such as a lithium-ion battery or a nickel-hydrogen battery. The battery 130 may be replaced with an electric double layer capacitor or another power accumulation device. The battery 130 is configured to accumulate power received by the inlet 110 or the power reception device 123.

The voltage sensor 131 detects voltage of the battery 130. The current sensor 132 detects current input/output to/from the battery 130.

The HMI device 170 includes an input device 172 and a display device 174. The input device 172 receives a user operation (for example, an operation for inputting a destination of the vehicle 50). The display device 174 displays various screens.

The communication device 180 is configured to wirelessly communicate with various devices (for example, the server 600 or a user terminal 300). The GPS receiver 181 acquires position information indicating a current position of the vehicle 50 from an artificial satellite. The position information may be sent to the server 600 through the communication device 180.

The ECU 150 includes a processor 151, a RAM 152, and a storage device 153. The processor 151 executes various arithmetic processes. The RAM 152 functions as a working memory that temporarily stores data processed by the processor 151. The storage device 153 stores a program executed by the processor 151 and various pieces of information (for example, the above-described contract information) used by the processor 151.

The ECU 150 controls various devices, such as a power reception device 123, an HMI device 170, and a communication device 180. The ECU 150 controls the external charging of the vehicle 50 by, for example, outputting a charging start request or a charging stop request to the power stand 40 or the power facility 45. When a destination of the vehicle 50 is set, the ECU 150 can also set a traveling route of the vehicle 50.

The external charging using power received by the vehicle 50 from the power stand 40 via a power cable 42 (described below) is wired charging. The external charging using power received by the vehicle 50 from the power facility 45 in a wireless manner is wireless charging. The wireless charging includes charging during traveling that is executed while the vehicle 50 is traveling in a power supply lane (described below).

The power facility 45 is configured to be operable as a power transmission facility that transmits power to the vehicle 50. The power facility 45 includes a coil 48, a voltage sensor 48A, a current sensor 48B, a communication device 46, and a control device 47. The coil 48 is connected to a commercial power source PS via an inverter (not shown). The coil 48 is configured to supply power to the vehicle 50 using power supplied from the commercial power source PS in a wireless manner (in more detail, via an electromagnetic field) or receive power from the vehicle 50 in a wireless manner.

The voltage sensor 48A detects voltage of power received or transmitted by the coil 48. The current sensor 48B detects current of power received or transmitted by the coil 48.

The control device 47 controls power transfer between the power facility 45 and the vehicle 50 during the DR period. The control device 47 calculates a power amount transmitted or received by the coil 48 during the DR period according to detected values of the voltage sensor 48A and the current sensor 48B. The communication device 46 is configured to communicate with the server 600, and sends, to the server 600, a transmitted power amount and a received power amount calculated by, for example, the control device 47.

The power facility 45 may be installed on the ground (for example, a traveling lane) or on a side wall. When the power facility 45 is installed in the traveling lane, the traveling lane is also referred to as a power supply lane.

The power stand 40 includes a power source circuit 44, a voltage sensor 44A, a current sensor 44B, a power cable 42, a connector 43, a communication device 49, and a control device 41.

The power source circuit 44 converts power supplied from the commercial power source PS and outputs the converted power to the power cable 42.

The voltage sensor 44A detects voltage input/output to/from the power source circuit 44. The current sensor 44B detects current input/output to/from the power source circuit 44.

The power cable 42 supplies power from the power stand 40 to the vehicle 50. The power cable 42 can also supply power from the vehicle 50 to the power stand 40.

The connector 43 is provided at the tip of the power cable 42 and is configured to be insertable into the inlet 110 of the vehicle 50.

The communication device 49 is configured to communicate with an external device, such as a server 600. The control device 41 controls the communication device 49 and the power source circuit 44.

The control device 41 is configured to be capable of executing power transmission processing that is processing for transmitting power from the power stand 40 to the vehicle 50 during the DR period. When the power transmission processing is executed, the external charging of the vehicle 50 is executed. After the power transmission processing (the external charging) is completed, the control device 41 sends the power amount transmitted by the power stand 40 during the DR period to the server 600 through the communication device 49.

The control device 41 is also configured to be capable of executing power reception processing that is processing for receiving power from the vehicle 50, to the power stand 40 during the DR period. After the power reception processing is completed, the control device 41 sends the power amount received by the power stand 40 to the server 600 through the communication device 49.

The control device 41 calculates the power amount received or transmitted by the power stand 40 during the DR period according to detection values of the voltage sensor 44A and the current sensor 44B during power transmission from the power stand 40 to the vehicle 50 or during power reception by the power stand 40 from the vehicle 50. The received power amount and the transmitted power amount are sent to the server 600 by the communication device 49.

The user terminal 300 is operated by the user of the vehicle 50. The user terminal 300 includes an input device 311, a display device 316, and a communication device 318. The input device 311 receives a user input. The display device 316 displays various screens. The communication device 318 is configured to communicate with a device (for example, the server 600) different from the user terminal 300.

Figure 3:
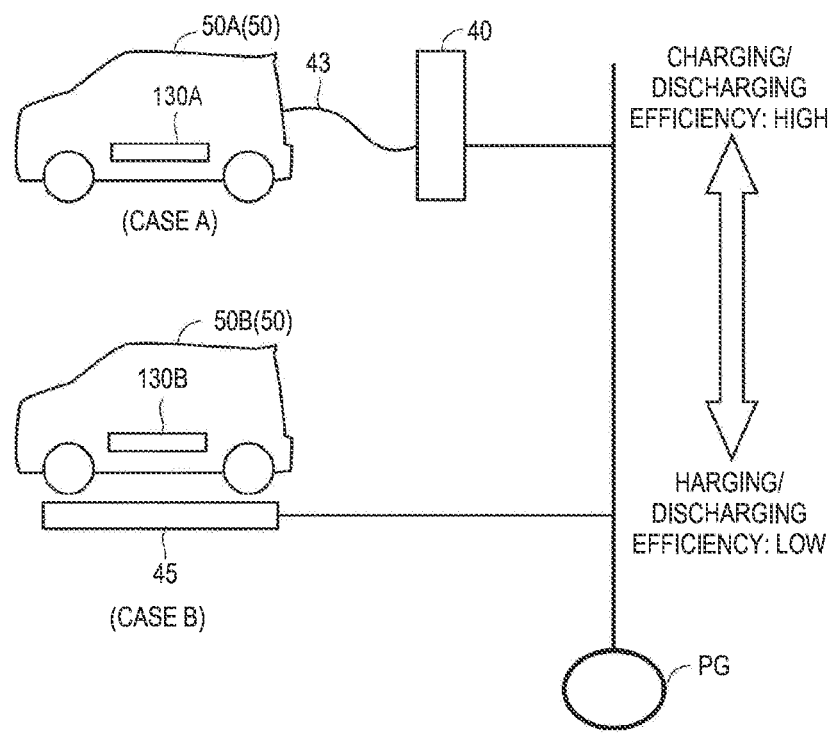
FIG. 3 is a diagram illustrating a situation where the vehicle is executing wired charging and a situation where the vehicle is executing wireless charging.

FIG. 3 is a diagram illustrating a situation where the vehicle 50 is executing the wired charging and a situation where the vehicle 50 is executing the wireless charging.

With reference to FIG. 3, when the vehicle 50 participates in the DR by the execution of the wired charging using the power stand 40 (case A), the vehicle 50 is also referred to as a vehicle 50A (a first vehicle). A battery 130A is the battery 130 mounted on the vehicle 50A.

When the vehicle 50 participates in the DR by the execution of the wireless charging using the power facility 45 (case B), the vehicle 50 is also referred to as a vehicle 50B (a second vehicle). A battery 130B is the battery 130 mounted on the vehicle 50B.

Figure 4:
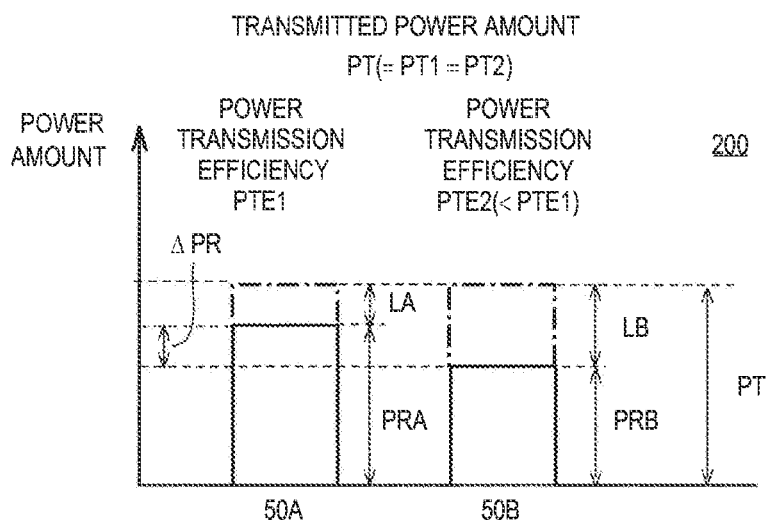
FIG. 4 is a diagram illustrating a difference between power amounts accumulated in batteries when vehicles participate in DR.

FIG. 4 is a diagram illustrating a difference between a power amount accumulated in the battery 130A when the vehicle 50A participates in the DR and a power amount accumulated in the battery 130B when the vehicle 50B participates in the DR.

With reference to FIG. 4, it is assumed that a transmitted power amount PT1 from the power stand 40 to the vehicle 50A is equal to a transmitted power amount PT2 from the power facility 45 to the vehicle 50B. In the description hereinbelow, when the transmitted power amounts PT1 and PT2 are not particularly distinguished from each other, each of these transmitted power amounts is also referred to as transmitted power amounts PT.

In the vehicle 50A, a power amount LA of the transmitted power amount PT is generated as a loss. As a result, the power amount charged in the battery 130A of the vehicle 50A due to the DR is PRA (<PT). A power transmission efficiency from the power stand 40 to the vehicle 50A during the wired charging during the DR period is also referred to as a power transmission efficiency PTE1.

In the vehicle 50B, a power amount LB of the transmitted power amount PT is generated as a loss. A power transmission efficiency from the power facility 45 to the vehicle 50B during the wireless charging during the DR period is also referred to as a power transmission efficiency PTE2. The power transmission efficiency PTE2 is generally lower than the power transmission efficiency PTE1. For this reason, the power loss generated in the wireless charging is larger than the power loss generated in wireless charging (LB>LA). As a result, the power amount charged in the battery 130B of the vehicle 50B due to the DR is PRB, and is smaller than the power amount charged in the battery 130A by the a difference ΔPR (PRB=PRA−ΔPR).

As above, when the transmitted power amounts PT1 and PT2 are equal to each other, in both cases A and B, a power load corresponding to the transmitted power amount PT is generated in the power system PG. Therefore, the vehicle 50B contributes to the power supply and demand balance in the power system PG to the same extent as the vehicle 50A. On the other hand, the vehicle 50B suffers a disadvantage as compared with the vehicle 50A in terms of the power amount charged in the battery 130 according to the participation in the DR.

Figure 5:
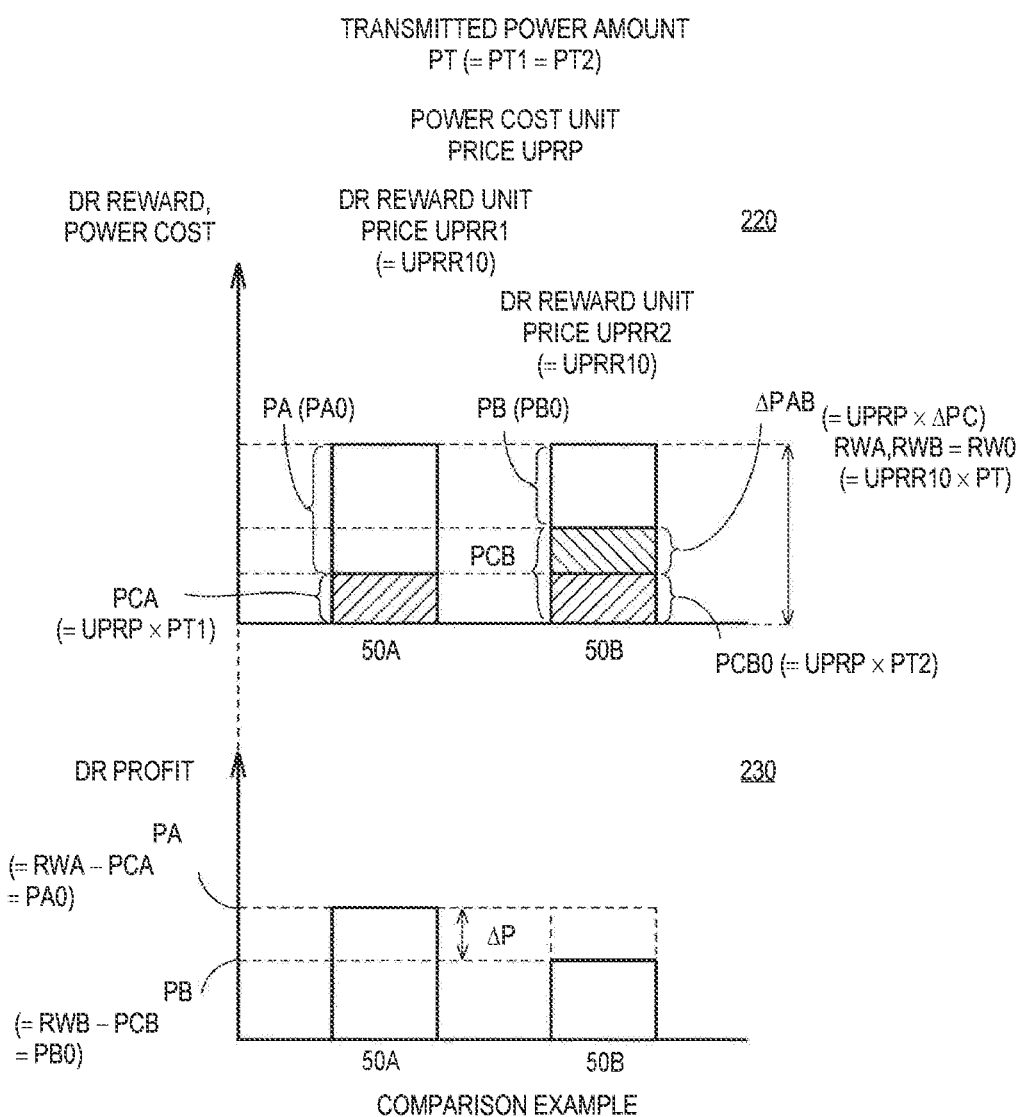
FIG. 5 is a diagram for describing a difference between the wired charging and the wireless charging in terms of a profit that is obtained when the vehicle participates in the DR.

FIG. 5 is a diagram for describing a difference between the wired charging and the wireless charging in terms of a profit that is obtained when the vehicle 50 participates in the DR. The example shows a comparison example when the processing by the server 600 described below is not executed.

With reference to FIG. 5, a graph 220 shows rewards given from the aggregator to the vehicles 50A, 50B in the comparison example, and a power rate charged to the vehicles 50A, 50B when these vehicles participate in the DR.

A DR reward RWA of the vehicle 50A and a DR reward RWB of the vehicle 50B are decided according to the degrees of contribution to an adjustment of the supply and demand balance in the power system PG by the vehicles 50A, 50B, respectively. For example, the power load in the power system PG is increased as the transmitted power amount PT is increased. For this reason, in the first embodiment, the DR rewards of the vehicles 50A, 50B are decided according to the transmitted power amounts PT during the DR period (for example, the rewards are increased as the transmitted power amount PT are increased).

A unit price of the DR reward RWA for the transmitted power amount PT1 is also referred to as a DR reward unit price UPRR1. A unit price of the DR reward RWB for the transmitted power amount PT2 is also referred to as a DR reward unit price UPRR2. In this example, the DR reward unit prices UPRR1, UPRR2 are both UPRR10. A power rate unit price of the power system PG is also referred to as a power cost unit price UPRP.

The DR reward RWA is RW0 (=UPRR10×PT1) decided according to the transmitted power amount PT1 (PT). A power cost PCA charged to the vehicle 50A according to the wired charging when the vehicle 50A participates in the DR is decided according to the power cost unit price UPRP and the transmitted power amount PT1 (PCA=UPRP×PT1). Therefore, a DR profit PA that is obtained when the vehicle 50A participates in the DR is PA0 (=RW0−PCA).

In the same manner, the DR reward RWB is RW0 (=UPRR10×PT2=RWA) decided according to the transmitted power amount PT2 (PT). A power cost PCB0 charged to the vehicle 50B according to the wireless charging when the vehicle 50B participates in the DR is decided according to the transmitted power amount PT2 and the power cost unit price UPRP (PCB0=UPRP×PT2). In this example, the power cost PCB0 of the vehicle 50B during the DR period is equal to the power cost PCA of the vehicle 50A.

During the DR period, the power amount charged in the battery 130B is smaller than the charged power amount in the battery 130A (FIG. 4). Therefore, when a power amount accumulated in the battery 130A is insufficient after the end of the DR period (for example, when the user of the vehicle 50B wants to fully charge the battery 130B), the vehicle 50B may need to execute extra wireless charging. In this example, in order to charge the battery 130B with a power amount of the difference ΔPR (FIG. 4), an extra power amount of a difference ΔPC needs to be transmitted from the power facility 45 to the vehicle 50B. The difference ΔPC depends on the difference ΔPR and the power transmission efficiencies PTE1, PTE2 (FIG. 4).

When the power amount of the difference ΔPC is transmitted from the power facility 45 to the vehicle 50B, an extra power cost ΔPAB (=UPRP×ΔPC) is charged to the user of the vehicle 50B due to the wireless charging. As a result, a total power cost PCB charged to the vehicle 50B is higher than the power cost PCA charged to the vehicle 50A (PCB=PCA+ΔPAB).

A graph 230 shows the DR profits obtained when the vehicles 50A, 50B participate in the DR in a comparison example. The DR profit PA is obtained by subtracting the power cost PCA from the DR reward RWA. The DR profit PB of the vehicle 50B is obtained by subtracting the power cost PCB from the DR reward RWB. In this example, since the DR reward RWB is equal to the DR reward RWA (the graph 220), the DR profit PB (PB0) of the vehicle 50B is smaller than the DR profit PA (PA0) of the vehicle 50A by the difference ΔP (=ΔPAB) between these profits.

As above, the vehicle 50B may suffer a disadvantage as compared with the vehicle 50A, and the user of the vehicle 50B may feel that the situation is unfair because of the loss as compared with the user of the vehicle 50A. When the user of the vehicle 50B loses the motivation to participate in the DR because he/she feels that the situation is unfair, the number of power resources participating in the DR by the wireless charging may be decreased. Alternatively, the vehicle 50B does not possibly execute the wireless charging during a period in which the vehicle 50B is required to participate in the DR by the wireless charging (for example, the charging during traveling). Then, after the end of the period, it can even be assumed that a situation where the vehicle 50B executes the wired charging instead of the wireless charging occurs. Such a situation can cause a situation where the power supply and demand balance is not appropriately adjusted.

The server 600 according to the first embodiment includes a configuration for dealing with the above shortcoming. Specifically, the communication device 630 acquires a transmitted power amount PT transmitted from the power facility during the external charging of the vehicle 50 participating in the DR. When each vehicle 50 participates in the DR, the processing device 605 sets a standard reward according to the transmitted power amount PT. The standard reward is the standard of the reward given from the aggregator to each vehicle 50. Details of a method of setting the standard reward will be described below.

When the vehicle 50A participates in the DR, the processing device 605 decides the DR reward RWA such that the DR reward RWA (a first reward) given from the aggregator to the vehicle 50A is the standard reward for the vehicle 50A. On the other hand, when the vehicle 50B participates in the DR, the processing device 605 decides the DR reward RWB such that the DR reward RWB (a second reward) given from the aggregator to the vehicle 50B is higher than the standard reward for the vehicle 50B.

With such a configuration, the DR reward RWA is the standard reward for the vehicle 50A whereas the DR reward RWB is higher than the standard reward for the vehicle 50B, and thus the vehicle 50B can benefit more than the vehicle 50A in terms of the reward. For this reason, it is possible to improve a situation where the vehicle 50B suffers a disadvantage as compared with the vehicle 50A.

In the first embodiment, the processing device 605 decides the DR reward RWA according to the transmitted power amount PT1 and the DR reward unit price UPRR1 (the first unit price). The processing device 605 decides the DR reward RWB according to the transmitted power amount PT2 and the DR reward unit price UPRR2 (the second unit price). The processing device 605 decides the DR reward unit price UPRR1 and the DR reward unit price UPRR2 such that the DR reward unit price UPRR2 is higher than the DR reward unit price UPRR1.

Figure 6:
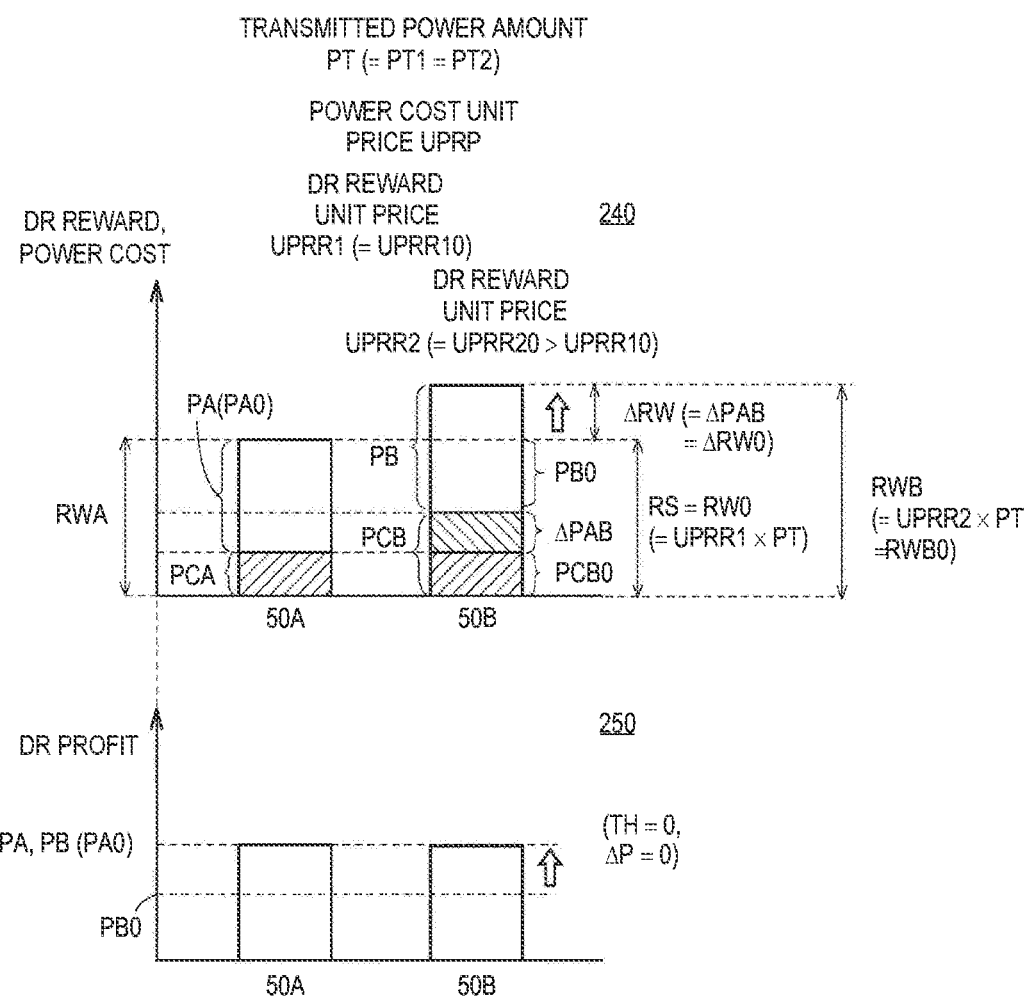
FIG. 6 is a diagram for describing a method of deciding a DR reward such that the DR reward is higher than a standard reward in a first embodiment.

FIG. 6 is a diagram for describing a method of deciding the DR reward RWB such that it is higher than the standard reward in the first embodiment.

With reference to FIG. 6, a graph 240 shows the DR rewards RWA, RWB in the first embodiment. The graph 240 differs from the graph 220 in that, in the former, the DR reward RWB is higher than that of the comparison example (FIG. 5) by the difference ΔRW. In more detail, the graph 240 differs from the graph 220 in that, in the former, the DR reward unit price UPRR2 (=UPRR20) is higher than that of the comparison example (UPRR20>UPRR10). Other than the above, the graph 240 is basically the same as the graph 220.

In the first embodiment, the standard rewards RS are set for the vehicles 50A, 50B. The standard rewards RS of the vehicles 50A, 50B are set according to the transmitted power amounts PT (for example, the standard rewards RS are increased as the transmitted power amounts PT are increased), and in this example, both are RW0.

The DR reward RWA of the vehicle 50A is decided such that it is equal to the standard reward RS of the vehicle 50A (RWA=RS). In this example, the DR reward unit price UPRR1 (=UPRR10) of the vehicle 50A is equal to that of the comparison example.

On the other hand, the DR reward RWB of the vehicle 50B is decided such that it is higher than the standard reward RS of the vehicle 50B by the difference ΔRW (=ΔPAB) (RWB=RWB0=RS+ΔRW). In more detail, the DR reward unit price UPRR2 is set to be higher than that of the comparison example (UPRR20>UPRR10). In other terms, the fact that the DR reward RWB is decided such that it is higher than the standard reward RS of the vehicle 50B as described above means the vehicle 50B is compensated (paid as an additional reward) as compared with that of the comparison example by the amount of the difference ΔRW.

As a result, even when the extra power cost ΔPAB is charged to the vehicle 50B due to the power loss during the wireless charging, the power cost ΔPAB and the additional reward of the difference ΔRW are offset.

A graph 250 shows the DR profits PA, PB in the first embodiment. In the first embodiment, the DR profit PB of the vehicle 50B is higher than that of the comparison example (PB0 of FIG. 5). As a result, the difference ΔP between the DR profits PA and PB is smaller than that of the comparison example (FIG. 5). In this example, the DR rewards RWA, RWB are decided such that the difference ΔP becomes zero. As such, the unfairness between the vehicles 50A and 50B is eliminated.

The DR rewards RWA, RWB may be decided such that the difference ΔP becomes lower than a threshold value TH. In this case, it is also possible to avoid a situation where the DR profits PA and PB deviate from each other. As a result, it is possible to appropriately decide the DR rewards RWA, RWB while decreasing unfairness as compared with that of the comparison example. The threshold value TH is appropriately determined in advance to be a value of zero or higher, but may be substantially zero.

As above, in the first embodiment, it is possible to avoid a situation where the user of the vehicle 50B loses the motivation to participate in the DR because he/she feels the situation is unfair. As a result, it is possible to contribute to an adjustment of a power supply and demand balance by restricting the number of the vehicles 50B participating in DR from being decreased.

FIG. 7 is a diagram illustrating an example of data stored in the storage device 620 of the server 600. With reference to FIG. 7, the storage device 620 stores adjustment plan information 650, power cost unit price information 670, resource information 665, power transmission plan information 666, and DR reward unit price/DR reward information 668.

The adjustment plan information 650 indicates an adjustment plan for the power supply and demand balance that is decided according to a contract concluded in advance between the aggregator and the power company. The adjustment plan information 650 indicates an adjustment request power amount ARP, an adjustment reward AR, an adjustment reward unit price ARUP, a total reward amount TRA, and an adjustment profit APR for each DR period. A length of each DR period may be, for example, 30 minutes, but is not limited thereto.

The adjustment request power amount ARP indicates a power amount requested by the power company to the aggregator such that the power amount is adjusted (delivered, increased, or decreased) in the power system PG. The adjustment reward AR indicates a reward received from the power company when the aggregator successfully adjusts the adjustment request power amount ARP. The adjustment reward unit price ARUP indicates a unit price of the adjustment reward AR for the adjustment request power amount ARP.

The total reward amount (a total distribution amount) TRA indicates a sum of the reward given (distributed) from the aggregator to each vehicle 50 from the adjustment profit APR. When at least one vehicle 50A and at least one vehicle 50B participate in the DR, the total reward amount TRA is an integrated value of a sum of the DR rewards RWA of the vehicles 50A and a sum of the DR rewards RWB of the vehicles 50B. Hereinafter, for simplification of the description, a case where the total reward amount TRA is a sum of the reward RWA of one vehicle 50A and the reward RWB of one vehicle 50B will be representatively described.

The adjustment profit APR indicates a profit that is obtained when the aggregator successfully achieves the power adjustment. The adjustment profit APR is a difference between the adjustment reward AR and the total reward amount TRA (APR=AR−TRA). The power cost unit price information 670 indicates the power cost unit price UPRP of the power system PG.

The resource information 665 indicates a method of the external charging of each power resource (in this example, each vehicle 50) for each resource ID. The resource ID is a number for identifying a power resource. Further, the resource information 665 indicates whether each power resource can participate in the DR, and the method of the external charging during the DR period for each period. The resource information 665 is decided according to the contents of a contract concluded between the aggregator and a user of each power resource.

A vehicle having a resource ID of R1 or R2 can execute both the wired charging and wireless charging. In this example, a vehicle having an ID of R1 corresponds to the vehicle 50A (FIG. 3) and a vehicle having an ID of R2 corresponds to the vehicle 50B.

The power transmission plan information 666 indicates the transmitted power amount PT and a method of power transmission from the power facility to the vehicle for each facility ID and each DR period. In this example, a power facility having an ID of PE1 corresponds to the power stand 40 and a power facility having an ID of PE2 corresponds to the power facility 45.

The DR reward unit price/DR reward information 668 indicates a unit price of the DR reward and a DR reward for a power resource for each resource ID and each DR period. The DR reward unit price/DR reward information 668 depends on the transmitted power amount PT of the power transmission plan information 666. For example, for the vehicle 50A having the resource ID of R1, the DR reward RWA during a period P1 is prA1 (=uprA1×a1).

Figure 8:
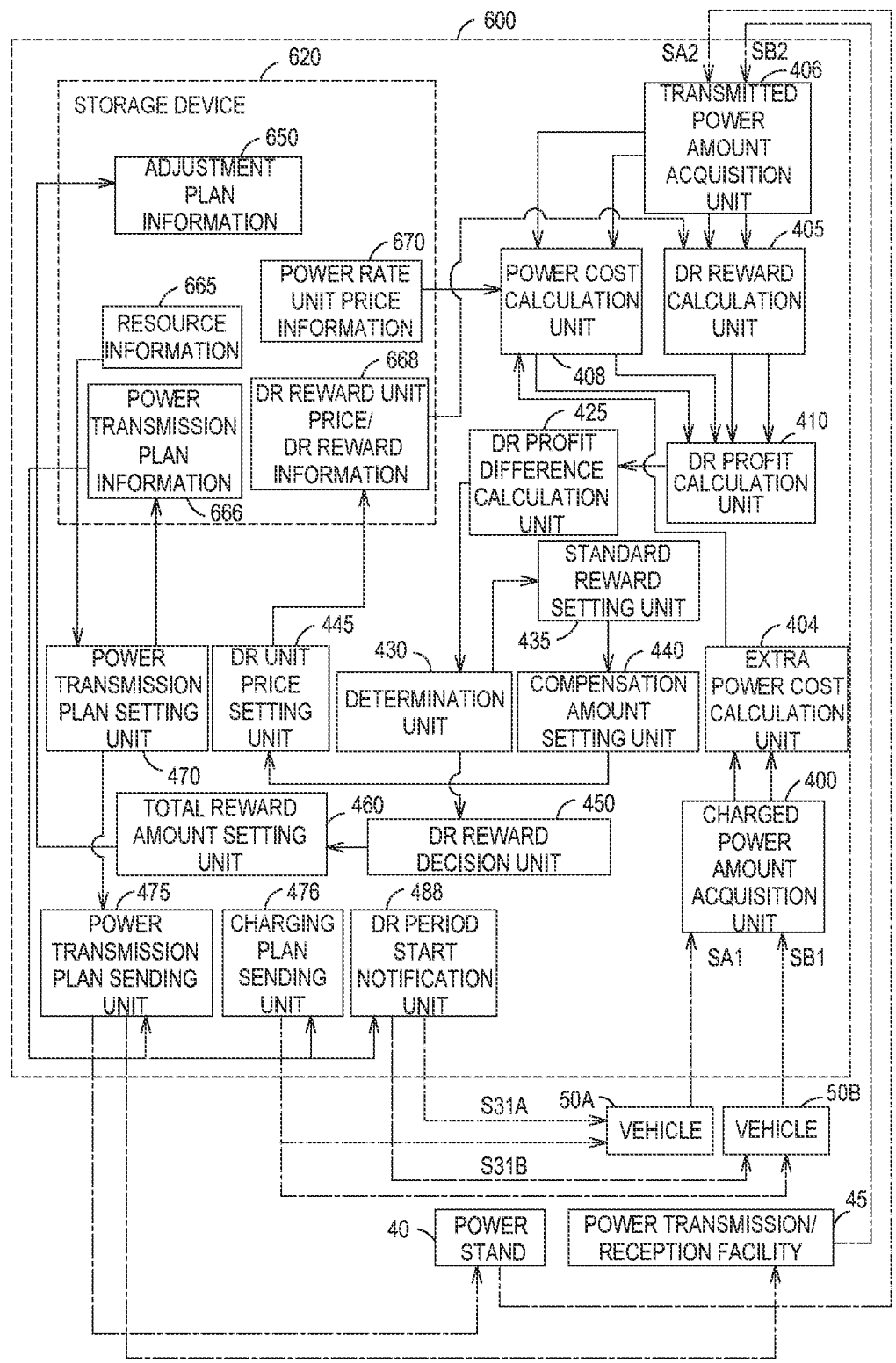
FIG. 8 is a functional block diagram for describing a function of a server according to the first embodiment.

FIG. 8 is a functional block diagram for describing a function of a server 600 according to the first embodiment. In the description hereinbelow, FIGS. 4 to 7 will be appropriately referred to.

With reference to FIG. 8, the server 600 includes a charged power amount acquisition unit 400, an extra power cost calculation unit 404, a transmitted power amount acquisition unit 406, a DR reward calculation unit 405, and a power cost calculation unit 408. The server 600 further includes a DR profit calculation unit 410, a DR profit difference calculation unit 425, a determination unit 430, a standard reward setting unit 435, a compensation amount setting unit 440, and a DR reward unit price setting unit 445. The server 600 further includes a DR reward decision unit 450, a total reward amount setting unit 460, a power transmission plan setting unit 470, a power transmission plan sending unit 475, a charging plan sending unit 476, and a DR period start notification unit 488.

Functions of the charged power amount acquisition unit 400, the transmitted power amount acquisition unit 406, the power transmission plan sending unit 475, the charging plan sending unit 476, and the DR period start notification unit 488 are achieved when the communication device 630 operates according to a command from the processing device 605. Other functions are achieved when the processing device 605 operates.

After the end of the DR period, the charged power amount acquisition unit 400 acquires signals SA1, SB1 from the vehicles 50A, 50B, respectively, by communication. The signal SA1 indicates a power amount charged in the battery 130A of the vehicle 50A during the DR period. The signal SB1 indicates a power amount charged in the battery 130B of the vehicle 50B during the DR period.

The extra power cost calculation unit 404 calculates the difference ΔPC by dividing the difference ΔPR (FIG. 4) of the power amounts charged in the batteries 130A, 130B by the power transmission efficiency PTE2 of the power facility 45. The difference ΔPC is an extra power amount needed to be transmitted from the power facility 45 to the vehicle 50B. The extra power cost calculation unit 404 calculates the extra power cost ΔPAB (FIG. 5) of the vehicle 50B according to the power cost unit price UPRP and the difference ΔPC. The power transmission efficiencies PTE1, PTE2 are calculated by the processing device 605 at the end of the DR period and stored in the storage device 620.

After the end of the DR period, the transmitted power amount acquisition unit 406 acquires signals SA2, SB2 from the power stand 40 and the power facility 45 respectively, by communication. The signal SA2 indicates the transmitted power amount PT1 during the DR period. The transmitted power amount PT1 is calculated by the control device 41 according to detection values of the voltage sensor 44A and the current sensor 44B of the power stand 40. The signal SB2 indicates the transmitted power amount PT2 during the DR period. The transmitted power amount PT2 is calculated by the control device 47 according to detection values of the voltage sensor 48A and the current sensor 48B of the power facility 45.

The DR reward calculation unit 405 calculates the provisional values of the DR rewards RWA, RWB according to an acquisition result by the transmitted power amount acquisition unit 406. Specifically, the DR reward calculation unit 405 calculates the provisional value of the DR reward RWA due to the DR reward unit price UPRR1 (in this example, UPRR10 of FIG. 6) in the DR reward unit price/DR reward information 668 (FIG. 7) and the transmitted power amount PT1. The provisional DR reward for the vehicle 50A calculated in this manner is also referred to as a provisional first reward. The provisional first reward may be, for example, RW0. Then, the DR reward calculation unit 405 calculates the provisional value of the DR reward RWB according to the transmitted power amount PT2 and the DR reward unit price UPRR2, by setting the DR reward unit price UPRR2 in the DR reward unit price/DR reward information 668 to a default value equal to the DR reward unit price UPRR1. The provisional DR reward for the vehicle 50B calculated in this manner is also referred to as a provisional second reward. The provisional second reward may be, for example, RW0 equal to the provisional first reward. The DR reward unit price UPRR2 in the DR reward unit price/DR reward information 668 can be changed later from the default value (described below).

The power cost calculation unit 408 calculates the power costs of the vehicles 50A, 50B during the DR period. Specifically, the power cost calculation unit 408 calculates the power cost PCA according to the transmitted power amount PT1 and the power cost unit price information 670 (FIG. 8). In the same manner, the power cost calculation unit 408 calculates the power cost PCB0 according to the transmitted power amount PT2 and the power cost unit price information 670. Further, the power cost calculation unit 408 calculates the power cost PCB according to the power cost PCB0 and the extra power cost ΔPAB of the vehicle 50B.

The DR profit calculation unit 410 calculates the provisional DR profit (a provisional first profit) of the vehicle 50A and the provisional DR profit (a provisional second profit) of the vehicle 50B. Specifically, the DR profit calculation unit 410 calculates the provisional first profit by subtracting the power cost PCA from the provisional first reward. In the same manner, the DR profit calculation unit 410 calculates the provisional second profit by subtracting the power cost PCB from the provisional second reward.

The DR profit difference calculation unit 425 calculates a provisional profit difference that is a difference between the provisional first profit and the provisional second profit.

The determination unit 430 determines, according to the provisional profit difference, whether the DR reward unit price UPRR2 needs to be changed from the default value. Specifically, the determination unit 430 determines whether the provisional profit difference is equal to or higher than a threshold value TH.

When the provisional profit difference is lower than the threshold value TH, it is decreased as there is no unfairness between the vehicle 50A and the vehicle 50B or as there is no problem in practical terms. In this case, the provisional first profit and the provisional second profit are decided to be a profit PA and a profit PB, respectively.

On the other hand, when the provisional profit difference is equal to or higher than the threshold value TH, the provisional second profit is lower than the provisional first profit to an extent that the unfairness cannot be ignored. Therefore, it is not desirable that the provisional first profit and the provisional second profit are decided to be the profit PA and the profit PB, respectively (for example, the graph 230 of FIG. 5).

The determination unit 430 may determine whether a difference between a ratio (a provisional first profit ratio) of the provisional first profit to the transmitted power amount PT1 and a ratio (a provisional second profit ratio) of the provisional second profit to the transmitted power amount PT2 is equal to or higher than a threshold rate. The threshold rate may be appropriately determined in advance such that it is substantially zero (for example, equal to or higher than 0, and lower than 0.1). As such, it is possible to determine whether there is unfairness even when the transmitted power amounts PT1 and PT2 are different from each other.

When the provisional profit difference is equal to or higher than the threshold value TH, the standard reward setting unit 435 sets the standard rewards RS of the vehicles 50A, 50B according to the transmitted power amounts PT. In the first embodiment, the standard reward setting unit 435 calculates the standard rewards RS of the vehicles 50A, 50B as multiplied values of the transmitted power amounts PT and the DR reward unit price UPRR1 (UPRR10 of FIG. 6). In this example, both of the standard rewards RS of the vehicles 50A, 50B are RW0 of FIG. 6.

The compensation amount setting unit 440 sets a compensation amount for the vehicle 50B such that the difference ΔP between the profits PA and PB is lower than the threshold value TH. In this example, the compensation amount setting unit 440 sets the compensation amount such that the extra power cost ΔPAB (FIG. 6) and the additional reward of the difference ΔRW are offset. The compensation amount is desirably equal to the power cost ΔPAB, but may be lower than the power cost ΔPAB.

The DR reward unit price setting unit 445 sets these unit prices such that the DR reward unit prices UPRR1, UPRR2 reflect the compensation amount. In this example, the DR reward unit price setting unit 445 maintains the DR reward unit price UPRR1 at UPRR10 (FIG. 6). On the other hand, the DR reward unit price setting unit 445 sets the DR reward unit price UPRR2 to UPRR20 that is higher than the default value (UPRR10), by rewriting the DR reward unit price/DR reward information 668.

Thereafter, the DR reward calculation unit 405 calculates the DR rewards RWA, RWB due to the DR reward unit price (the DR reward unit price/DR reward information 668 after the rewriting) set as above. In this example, the DR reward RWA is maintained at RW0 that is equal to the provisional first reward. On the other hand, the DR reward RWB is increased by the difference ΔRW from RW0 that is the provisional second reward.

The DR profit calculation unit 410 calculates the DR profit PA (FIG. 6) due to the DR reward RWA calculated as above and the power cost PCA. In the same manner, the DR profit calculation unit 410 calculates the DR profit PB due to the DR reward RWB calculated as above and the power cost PCB.

The DR profit difference calculation unit 425 calculates the difference ΔP between the DR profits PA and PB. In this example, the DR reward unit price/DR reward information 668 has already been rewritten such that the difference ΔP becomes lower than the threshold value TH.

The determination unit 430 determines whether the difference ΔP is equal to or higher than the threshold value TH, and determines that the difference ΔP becomes lower than the threshold value TH.

The DR reward decision unit 450 decides that the DR rewards RWA, RWB calculated according to the DR reward unit price/DR reward information 668 after the rewriting are the DR rewards of the vehicles 50A, 50B, respectively. The decided DR rewards RWA, RWB are sent to a server (not shown) that manages bank accounts of the users of the vehicles 50A, 50B.

The total reward amount setting unit 460 sets the total reward amount TRA (FIG. 7) according to the decision results of the rewards RWA, RWB. In this example, for simplification of the description, the total reward amount TRA is a sum of the rewards RWA, RWB. When the total reward amount setting unit 460 sets the total reward amount TRA as above, the total reward amount TRA is increased as the DR reward RWB is increased. The total reward amount setting unit 460 rewrites the adjustment plan information 650 such that the total reward amount TRA is increased. As such, the adjustment profit APR (FIG. 6) is decreased (updated) as compared with the adjustment plan information 650 before the rewriting.

The power transmission plan setting unit 470 sets the power transmission plans of the power stand 40 and the power facility 45 during the DR period according to the adjustment plan information 650 and the resource information 665. Specifically, the power transmission plan setting unit 470 selects a power resource (for example, the vehicles 50A, 50B) capable of participating in the DR during the target period from among a plurality of power resources according to the resource information 665. The power transmission plan setting unit 470 sets the power transmission plan information 666 according to the adjustment request power amount ARP determined by the adjustment plan information 650.

The power transmission plan sending unit 475 sends the power transmission plan information 666 to the power facility (the power stand 40 and the power facility 45). The power stand 40 and the power facility 45 transmit the transmitted power amounts PT during the DR period to the vehicles 50A, 50B, respectively, according to the sent power transmission plan information 666.

The charging plan sending unit 476 sends the external charging plan during the DR period to the vehicles 50A, 50B. This plan includes information indicating the start time and the end time of the DR period. This plan is prepared according to the power transmission plan information 666.

When the start time of the DR period of each of the vehicles 50A, 50B arrives, the DR period start notification unit 488 executes processing for sending notifications to the users of the vehicles 50A, 50B. Specifically, the DR period start notification unit 488 sends notification signals S31A, S31B for notifying the arrival of the start time to the vehicles 50A, 50B, respectively.

For example, the vehicle 50B participates in the DR by executing the charging during traveling. When the vehicle 50B is traveling in a traveling lane (for example, a traveling lane that is adjacent to the power supply lane and that does not have a power supply function) different from the power supply lane until the start time of the DR period arrives, the notification signal S31B prompts the user of the vehicle 50B such that the vehicle 50B travels in the power supply lane.

Specifically, in response to receiving the notification signal S31B, the ECU 150 of the vehicle 50B displays a notification screen for sending the above notification to the user on the display device 174 of the HMI device 170. The ECU 150 may control the communication device 180 such that the notification screen is displayed on the display device 316 of the user terminal 300. As such, when the notification is sent, the aggregator can reliably enable the vehicle 50B to participate in the DR.

Figure 9:
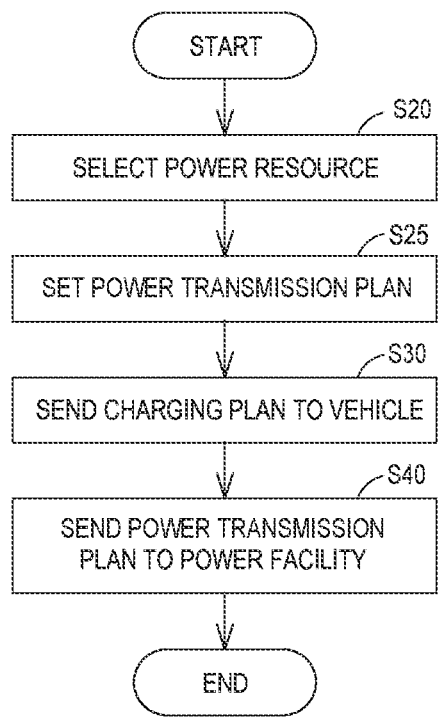
FIG. 9 is a flowchart illustrating an example of processing executed by a processing device of a server before a target DR period arrives in the first embodiment.

FIG. 9 is a flowchart illustrating an example of processing executed by the processing device 605 of the server 600 before the target DR period arrives in the first embodiment. The processing of this flowchart is started when the server 600 receives the adjustment request ARE (FIG. 1) indicating that the power supply is larger than the power demand in the power system PG during the target DR period.

With reference to FIG. 9, the processing device 605 selects the power resources (in this example, the vehicles 50A, 50B) capable of participating in the DR during the target period according to the resource information 665 (step S20).

Next, the processing device 605 sets the power transmission plan information 666 according to the adjustment request power amount ARP determined by the adjustment plan information 650 (step S25).

Next, the processing device 605 sends plans on the external charging to the vehicles 50A, 50B (step S30), and sends the power transmission plan information 666 to the power facilities (the power stand 40 and the power facility 45) (step S40).

Figure 10:
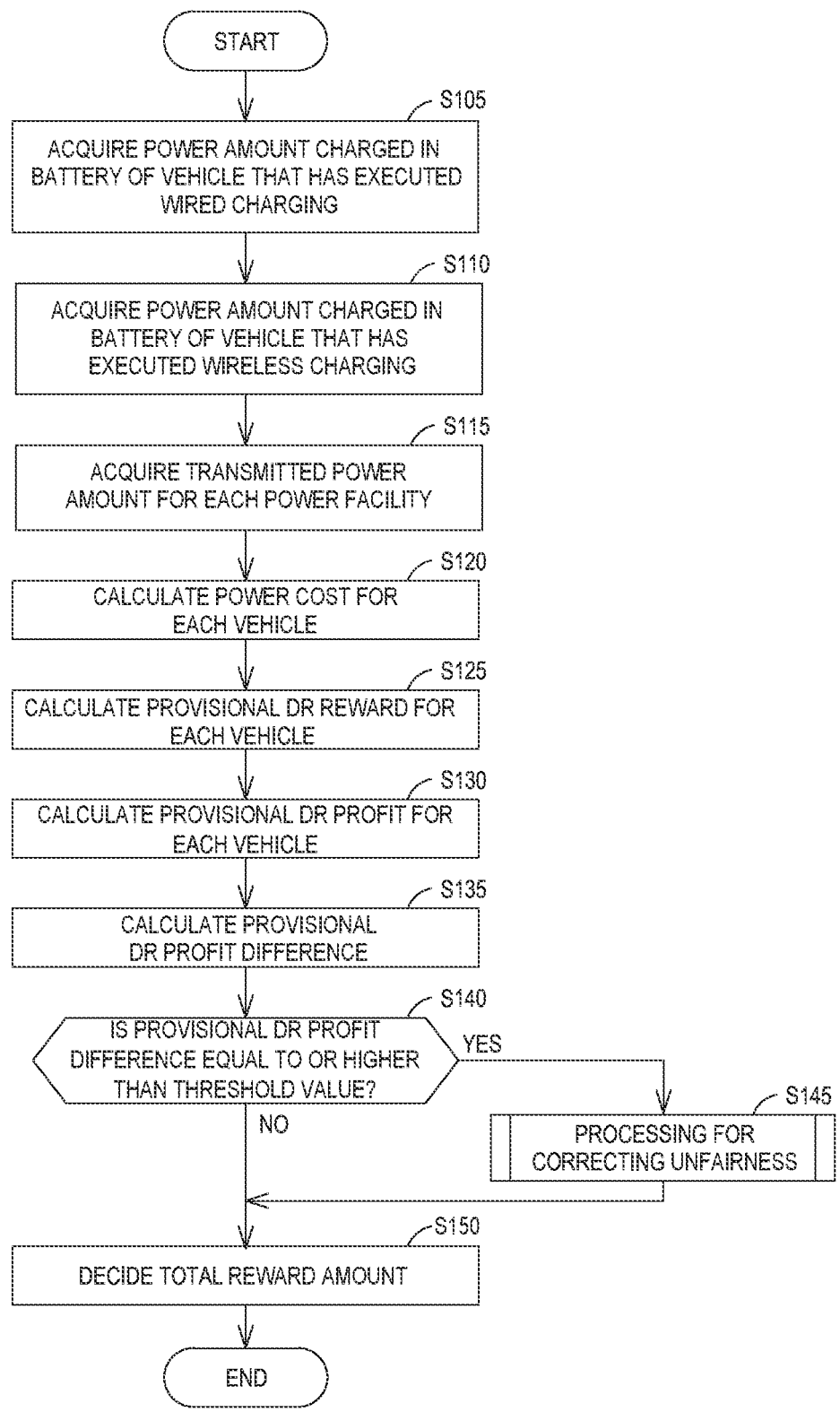
FIG. 10 is a flowchart illustrating an example of processing executed by the processing device after a target DR period is ended in the first embodiment.

FIG. 10 is a flowchart illustrating an example of processing executed by the processing device 605 after the target DR period is ended in the first embodiment.

With reference to FIG. 10, the processing device 605 acquires the power amount charged in the battery 130A of the vehicle 50A that has executed the wired charging for the DR from the vehicle 50A through the communication device 630 (step S105).

Next, the processing device 605 acquires the power amount charged in the battery 130B of the vehicle 50B that has executed the wireless charging for the DR from the vehicle 50B through the communication device 630 (step S110).

Next, the processing device 605 acquires the transmitted power amount PT for each power facility (in this example, the power stand 40 and the power facility 45) used for the DR (step S115).

Next, the processing device 605 calculates the power cost for each vehicle participating in the DR (step S120). In this example, the processing device 605 calculates the power costs PCA, PCB (FIG. 6). The power cost PCB includes a power cost PCB0 due to the DR and an extra power cost ΔPAB.

Next, the processing device 605 calculates the provisional DR reward for each vehicle (step S125). In this example, the processing device 605 calculates the provisional first reward for the vehicle 50A and the provisional second reward for the vehicle 50B.

Next, the processing device 605 calculates the provisional DR profit for each vehicle (step S130). In this example, the processing device 605 calculates the provisional first profit for the vehicle 50A and the provisional second profit for the vehicle 50B.

Next, the processing device 605 calculates the provisional profit difference between the vehicles 50A and 50B by calculating the difference between the provisional first profit of the vehicle 50A and the provisional second profit of the vehicle 50B (step S135).

Next, the processing device 605 determines whether the provisional DR profit difference is equal to or higher than the threshold value TH (step S140). When the provisional DR profit difference is lower than the threshold value TH (NO in step S140), the processing device 605 proceeds to a process of step S150. On the other hand, when the provisional DR profit difference is equal to or higher than the threshold value TH (YES in step S140), the processing device 605 executes processing for correcting the unfairness between the vehicle 50A and the vehicle 50B (step S145).

Figure 11:
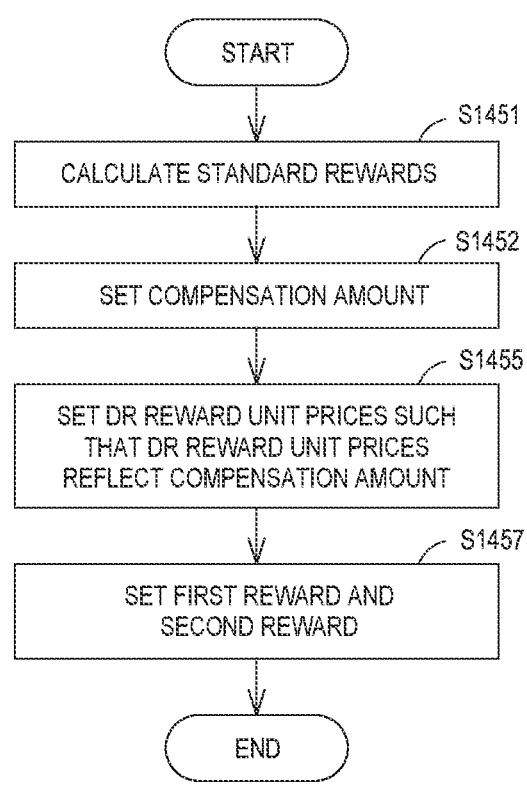
FIG. 11 is a flowchart for describing details of processing for correcting unfairness (step S145 of FIG. 10)

FIG. 11 is a flowchart for describing details of the processing for correcting unfairness (step S145 of FIG. 10).

With reference to FIG. 11, the processing device 605 calculates the standard rewards RS for the vehicles 50A, 50B according to the transmitted power amounts PT (step S1451). In this example, the transmitted power amount PT1 is equal to the transmitted power amount PT2, and both of the standard rewards RS of the vehicles 50A, 50B are RW0 (FIG. 6).

Next, the processing device 605 sets a reward (for example, an additional reward of the difference ΔRW of FIG. 6) given as a compensation amount for the vehicle 50B (step S1452).

Next, the processing device 605 sets these DR reward unit prices such that the DR reward unit prices UPRR1, UPRR2 reflect the compensation amount (step S1455). Specifically, the processing device 605 sets these DR reward unit prices such that the difference ΔP of FIG. 6 is lower than the threshold value TH.

Next, the processing device 605 decides the DR reward RWA (the first reward) and the DR reward RWB (the second reward) according to the DR reward unit prices UPRR1, UPRR2 set in step S1455 (step S1457). In this example, the DR reward RWA is RW0 (FIG. 6) and the DR reward RWB is RW0+ΔRW. Thereafter, the process proceeds to step S150 (FIG. 10).

With reference to FIG. 10 again, the processing device 605 decides the total reward amount TRA according to decision results of the DR rewards RWA, RWB (step S150). Thereafter, a series of processes ends.

Figure 12:
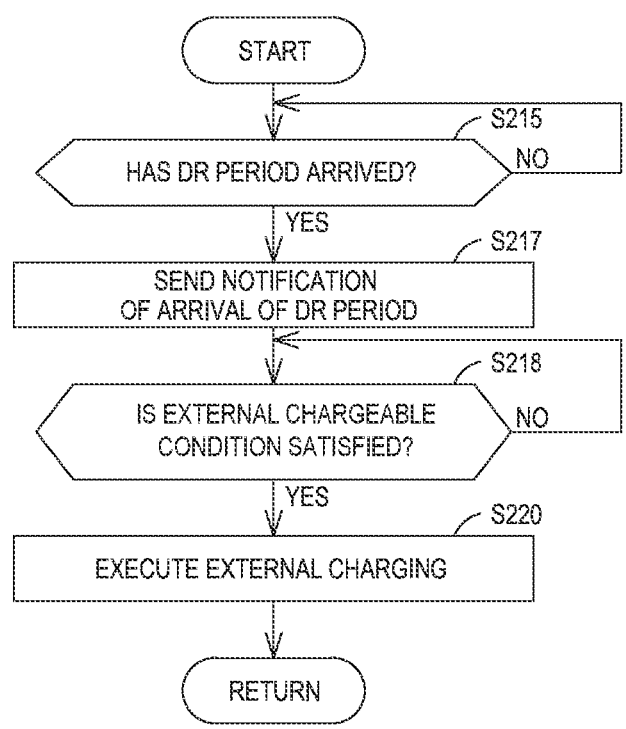
FIG. 12 is a flowchart illustrating an example of processing executed by an ECU of the vehicle.

FIG. 12 is a flowchart illustrating an example of processing executed by the ECU 150 of the vehicle 50. The processing of this flowchart is started when the vehicle 50 sends an approval signal S11 (FIG. 1) to the server 600 when the traveling route of the vehicle 50 is set.

Next, the ECU 150 determines whether the DR period has arrived (step S215). The ECU 150 executes the determination process according to the contract information stored in the storage device 153. When the DR period has not yet arrived (NO in step S215), the ECU 150 executes the determination process until this period arrives. On the other hand, when the DR period has arrived (YES in step S215), the ECU 150 proceeds to step S217.

Next, the ECU 150 sends a notification indicating the arrival of the DR period to the user of the vehicle 50 (step S217). For example, when the ECU 150 is mounted on the vehicle 50B and the vehicle 50B participates in the DR by executing the charging during traveling, the ECU 150 displays the above-described notification screen on the display device 174.

Next, the ECU 150 determines whether an external chargeable condition of the vehicle 50 is satisfied (step S218). When the vehicle 50 is the vehicle 50A, the external chargeable condition is that the connector 43 is inserted into the inlet 110. When the vehicle 50 is the vehicle 50B, the external chargeable condition is that the distance between the vehicle 50 and the power facility 45 is shorter than a threshold distance at which the vehicle 50 can receive power from the power facility 45 (for example, the vehicle 50 is traveling in the power supply lane).

When the external chargeable condition is not satisfied (NO in step S218), the ECU 150 executes the determination process until the condition is satisfied. On the other hand, when the external chargeable condition is satisfied (YES in step S218), the ECU 150 proceeds to step S220.

Next, the ECU 150 executes the external charging (the wired charging or the wireless charging) in order for the vehicle 50 to participate in the DR (step S220). The external charging is continued until the DR period is ended.

Modified Example 1 of First Embodiment

In the above-described first embodiment, the processing device 605 decides the rewards RWA, RWB such that the reward RWB is increased while the reward RWA is maintained (FIG. 6). As a result, the total reward amount TRA (FIG. 7) from the aggregator to each vehicle 50 is increased.

In the modified example 1, the processing device 605 decides the reward RWA and the reward RWB such that the total reward amount TRA of the adjustment plan information 650 is constantly maintained.

As a result, the situation where the total reward amount TRA is increased is avoided. Therefore, the aggregator can appropriately distribute the total reward amount TRA to the vehicles 50A, 50B while avoiding the situation where the adjustment profit APR (FIG. 7) is decreased as the total reward amount TRA is increased. As such, it is possible to contribute to an adjustment of the power supply and demand balance by avoiding the situation where the number of business operators newly participating in the aggregator business is decreased.

Figure 13:
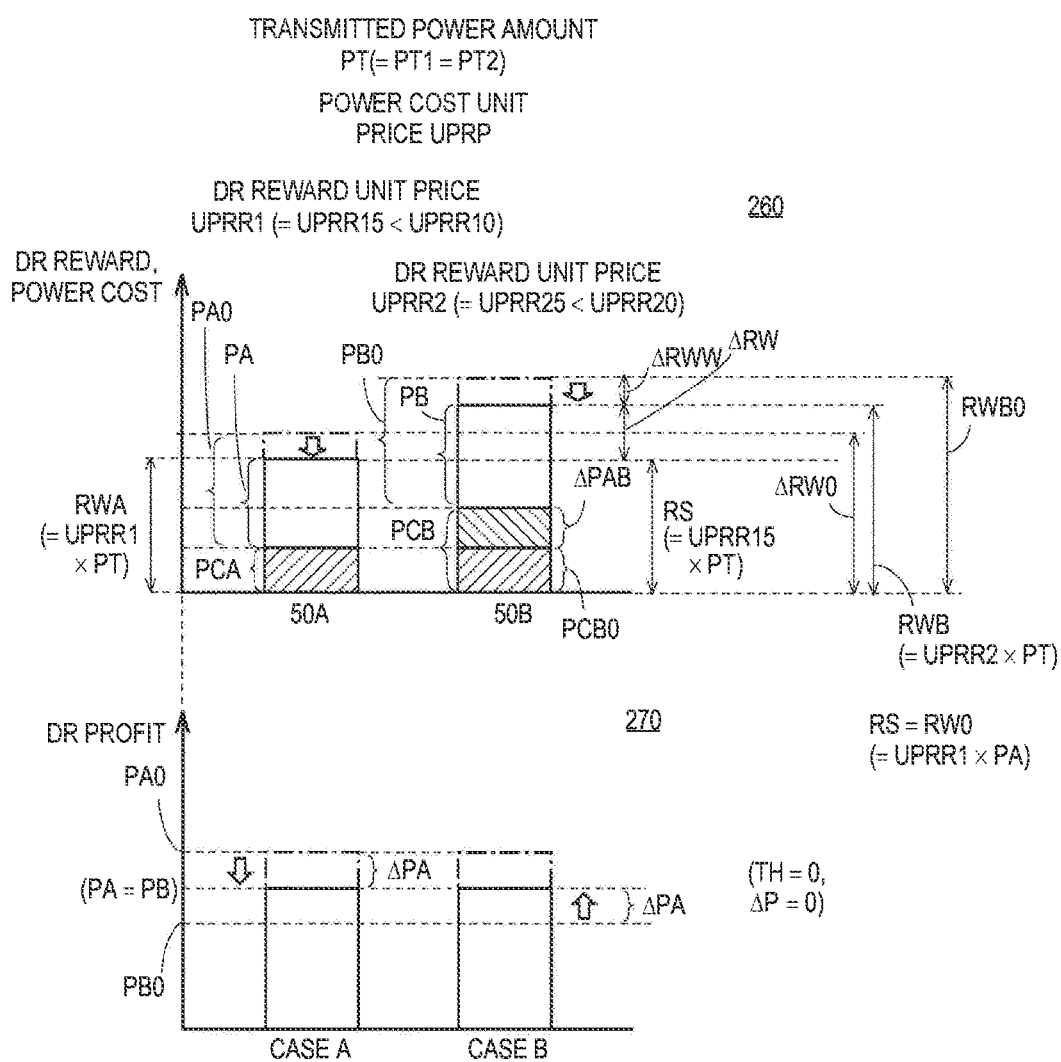
FIG. 13 is a diagram for describing a method of deciding a DR reward for the vehicle in a modified example 1.

FIG. 13 is a diagram for describing a method of deciding the DR rewards of the vehicles 50A, 50B in the modified example 1.

With reference to FIG. 13, a graph 260 shows the standard rewards RS and the DR rewards RWA, RWB of the vehicles 50A, 50B in this modified example. In this example, both of the standard rewards RS of the vehicles 50A, 50B are lower than the standard reward (RW0 of FIG. 6) of the first embodiment.

The DR reward unit price UPRR1 is set to be lower than that of the above-described first embodiment (UPRR15<UPRR10). The DR reward RWA is equal to the standard reward RS (=UPRR15×PT) of the vehicle 50A, but lower than RW0 of the first embodiment.

The DR reward RWB is decided such that it is higher than the standard reward RS of the vehicle 50B by the difference ΔRW, but is lower than RWB0 in the case of the first embodiment (FIG. 6) by the difference ΔRWW. In this example, the DR reward unit price UPRR2 is set to be lower than that in the above-described first embodiment, but is decided such that it is higher than the DR reward unit price UPRR1 (UPRR15<UPRR2=UPRR25<UPRR10).

A graph 270 shows the DR profits that are obtained when the vehicles 50A, 50B participate in the DR in the modified example 1. The DR profit PA is decided such that it is lower than that in the case of the first embodiment (PA0 of FIG. 6) by ΔPA. On the other hand, in this example, the DR profit PB is higher than the DR profit PB (PB0) of the comparison example by ΔPA. In other words, a part (ΔPA) of the DR profit (PA0) of the vehicle 50A is compensated by the DR profit PB.

Figure 14:
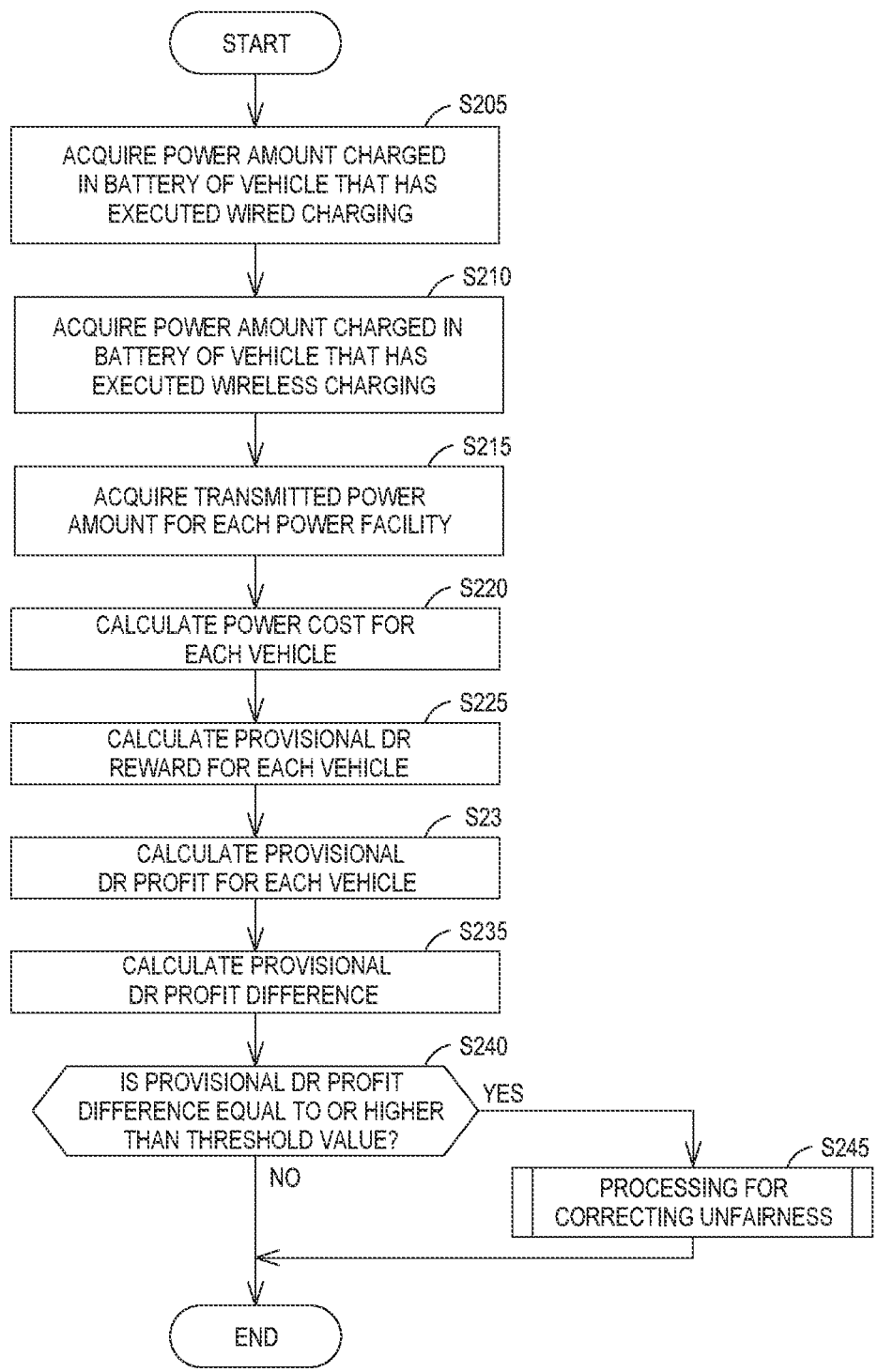
FIG. 14 is a flowchart illustrating an example of processing executed by the processing device after the target DR period is ended in the modified example 1.

FIG. 14 is a flowchart illustrating an example of processing executed by the processing device 605 after the target DR period is ended in the modified example 1. In this example, the total reward amount (the total distribution amount) TRA is constantly maintained.

With reference to FIG. 14, the flowchart differs from that of the above-described first embodiment (FIG. 10) in that, in the former, the process of deciding the total reward amount (step S150) is not executed. The processes of steps S205 to S245 are the same as those of steps S105 to S145 of FIG. 6, respectively.

In step S245, the DR rewards RWA, RWB (in more detail, the DR reward unit prices UPRR1, UPRR2) are decided such that the total reward amount TRA is maintained. Specifically, the DR rewards RWA, RWB are decided such that a part of the DR profit of the vehicle 50A is compensated by the DR profit PB (see FIG. 13).

Modified Example 2 of First Embodiment

When the vehicle 50A and the vehicle 50B use the paid infrastructure 310 for vehicles, the processing device 605 may decide the reward RWA and the reward RWB such that the vehicle 50B can use the paid infrastructure 310 at a cheaper usage fee than the vehicle 50A.

For example, the processing device 605 outputs a request to discount the usage fee of the vehicle 50B by the difference ΔRW (FIG. 6) from the usage fee of the vehicle 50A to the server 305 (FIG. 1) of the business operator who manages the paid infrastructure 310. In this example, the server 305 permits the vehicle 50B to use the paid infrastructure 310 at the discounted amount. Thereafter, the processing device 605 executes payment processing such that the aggregator pays a rate of the difference ΔRW to the business operator who manages the paid infrastructure 310.

As such, the rate of the difference ΔRW from the DR reward RWB of the vehicle 50B is indirectly paid to the vehicle 50B as the discounted amount from the aggregator through the business operator. As such, in a modified example 2, the DR reward RWB includes a reward (equal to the DR reward RWA of the vehicle 50A) directly paid from the aggregator to the vehicle 50B, and a reward (the discounted amount) indirectly paid from the aggregator to the vehicle 50B as the discounted amount. As such, the vehicle 50B can benefit more than the vehicle 50A in terms of the usage fee of the paid infrastructure 310.

Figure 15:
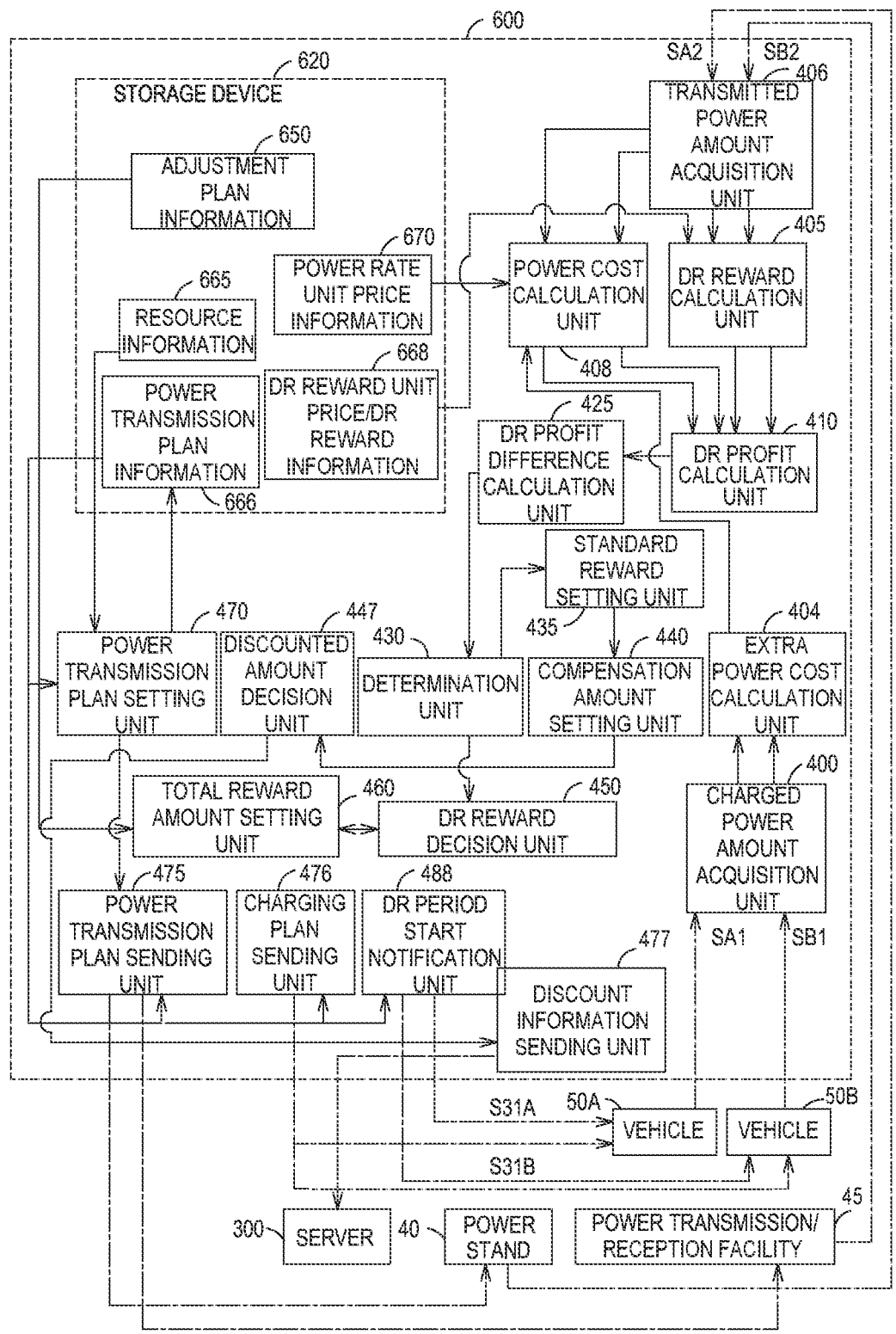
FIG. 15 is a functional block diagram for describing a function of a server according to a modified example 2.

FIG. 15 is a functional block diagram for describing a function of the server 600 according to the modified example 2. With reference to FIG. 15, the server 600 according to the modified example 2 differs from the server 600 of the first embodiment (FIG. 8) in that, in the modified example 2, it includes the discounted amount decision unit 447 and the discount information sending unit 477 instead of the DR reward unit price setting unit 445. In other terms, a functional configuration of the server 600 according to the modified example 2 is basically the same as that of the server 600 of the first embodiment.

When the determination unit 430 determines that the provisional DR profit difference is equal to or higher than the threshold value TH, the DR reward decision unit 450 decides that the provisional first reward and the provisional second reward that is equal to the provisional first reward, are the DR rewards directly paid from the aggregator to the vehicles 50A, 50B, respectively. Further, the standard reward setting unit 435 sets the standard rewards RS of the vehicles 50A, 50B to the provisional first reward and the provisional second reward, respectively. The compensation amount setting unit 440 sets the compensation amount for the vehicle 50B according to the provisional DR profit difference and the standard reward RS of the vehicle 50B.

The discounted amount decision unit 447 decides the discounted amount when the vehicle 50B uses the paid infrastructure 310 according to the compensation amount. The discounted amount decision unit 447 decides the discounted amount according to, for example, the difference ΔRW (FIG. 6). The discount information sending unit 477 sends information indicating the decided discounted amount to the server 305.

Figure 16:
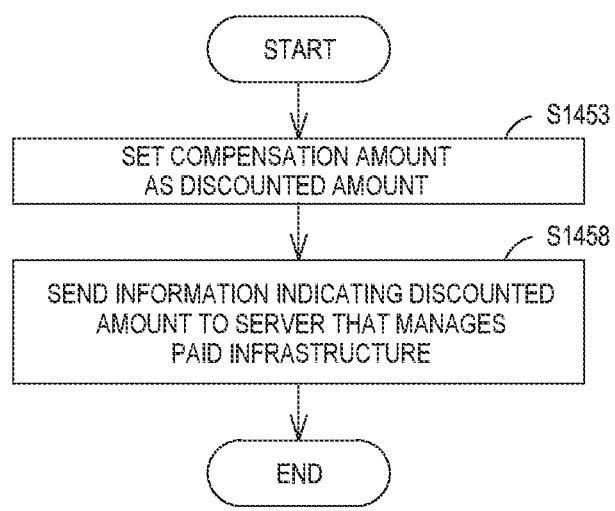
FIG. 16 is a flowchart illustrating details of processing for correcting unfairness between vehicles in the modified example 2.

FIG. 16 is a flowchart illustrating details of processing executed for correcting unfairness between the vehicle 50A and the vehicle 50B in the modified example 2. The processing is executed when the provisional DR profit difference is equal to or higher than the threshold value TH in step S140 of FIG. 10 (NO in step S140).

With reference to FIG. 16, the processing device 605 sets the compensation amount as a discounted amount for the vehicle 50B (step S1453). Next, the processing device 605 sends information indicating the set discounted amount to the server 305 that manages the paid infrastructure 310 (step S1458). Thereafter, the process proceeds to step S150 of FIG. 10.

Second Embodiment

Each vehicle 50 including the vehicles 50A, 50B may be configured to be capable of executing the external power supply for supplying power accumulated in the battery 130 to the power facility (for example, the power stand 40 or the power facility 45). In this case, the power facility 45 operates as a power reception facility that receives power from the vehicle 50 in a wireless manner.

When each vehicle 50 executes the external power supply, power is supplied from each vehicle 50 to the power system PG through the power facility, and thus it is possible to increase the power supply in the power system PG. Therefore, when the power demand is larger than the power supply in the power system PG, each vehicle 50 can participate in the DR by executing the external power supply.

The external power supply in which the vehicle 50A supplies power accumulated in the battery 130A to the power stand 40 via the power cable 42 is also referred to as wired power supply. The external power supply in which the vehicle 50B supplies power accumulated in the battery 130B to the power facility 45 in a wireless manner is also referred to as wireless power supply. When the wireless power supply is executed, the power reception device 123 functions as a power supply device that supplies power from the vehicle 50 to the power facility 45 in a wireless manner. In other words, the vehicle 50B can execute the wireless power supply through the power supply device.

Hereinafter, for simplification of the description, the power amount transmitted from the vehicle 50A to the power stand 40 is equal to the power amount transmitted from the vehicle 50B to the power facility 45.

A power loss amount from the power amount transmitted from the vehicle 50 to the power facility is generally larger when the vehicle 50B participates in the DR by executing the wireless power supply than when the vehicle 50A participates in the DR by executing the wired power supply. For this reason, the received power amount of the power facility 45 due to the DR may be smaller than the received power amount of the power stand 40. Therefore, the power amount supplied from the vehicle 50B to the power system PG through the power facility 45 is smaller than that supplied from the vehicle 50A to the power system PG through the power stand 40.

As such, the vehicle 50B has a lower degree of contribution to the power system PG than the vehicle 50A. As a result, even when the vehicles 50A, 50B have the same decreased power amounts of the battery 130, the reward for the vehicle 50B may be lower than the reward for the vehicle 50A. Alternatively, when the received power amount received by the power stand 40 from the vehicle 50A is equal to that received by the power facility 45 from the vehicle 50B, the decreased power amount of the battery 130B due to the DR is larger than that of the battery 130A due to a difference in power loss amounts. Therefore, unfairness is caused between vehicles 50A and 50B.

The processing device 605 of the server 600 according to a second embodiment includes a configuration for dealing with the above shortcoming.

Specifically, the communication device 630 acquires a received power amount received by the power facility from the vehicle 50 participating in the DR during the external power supply of the vehicle 50. The communication device 630 acquires, for example, a power amount (a first received power amount) received by the power stand 40 from the vehicle 50A during the DR period and a power amount (a second received power amount) received by the power facility 45 from the vehicle 50B during the DR period.

When each vehicle 50 participates in the DR by executing the external power supply, the processing device 605 calculates the standard reward RS according to the received power amount of the power facility. For example, when the vehicle 50A participates in the DR by executing the wired power supply, the processing device 605 calculates the standard reward RS of the vehicle 50A according to the received power amount of the power stand 40 during the DR period. Then, the processing device 605 decides the DR reward RWA such that it becomes the standard reward RS of the vehicle 50A.

In the same manner, when the vehicle 50B participates in the DR by executing the wireless power supply, the processing device 605 calculates the standard reward RS of the vehicle 50B according to the received power amount of the power facility 45 during the DR period. Then, the processing device 605 decides the DR reward RWB such that it is higher than the standard reward RS of the vehicle 50B.

Figure 17:
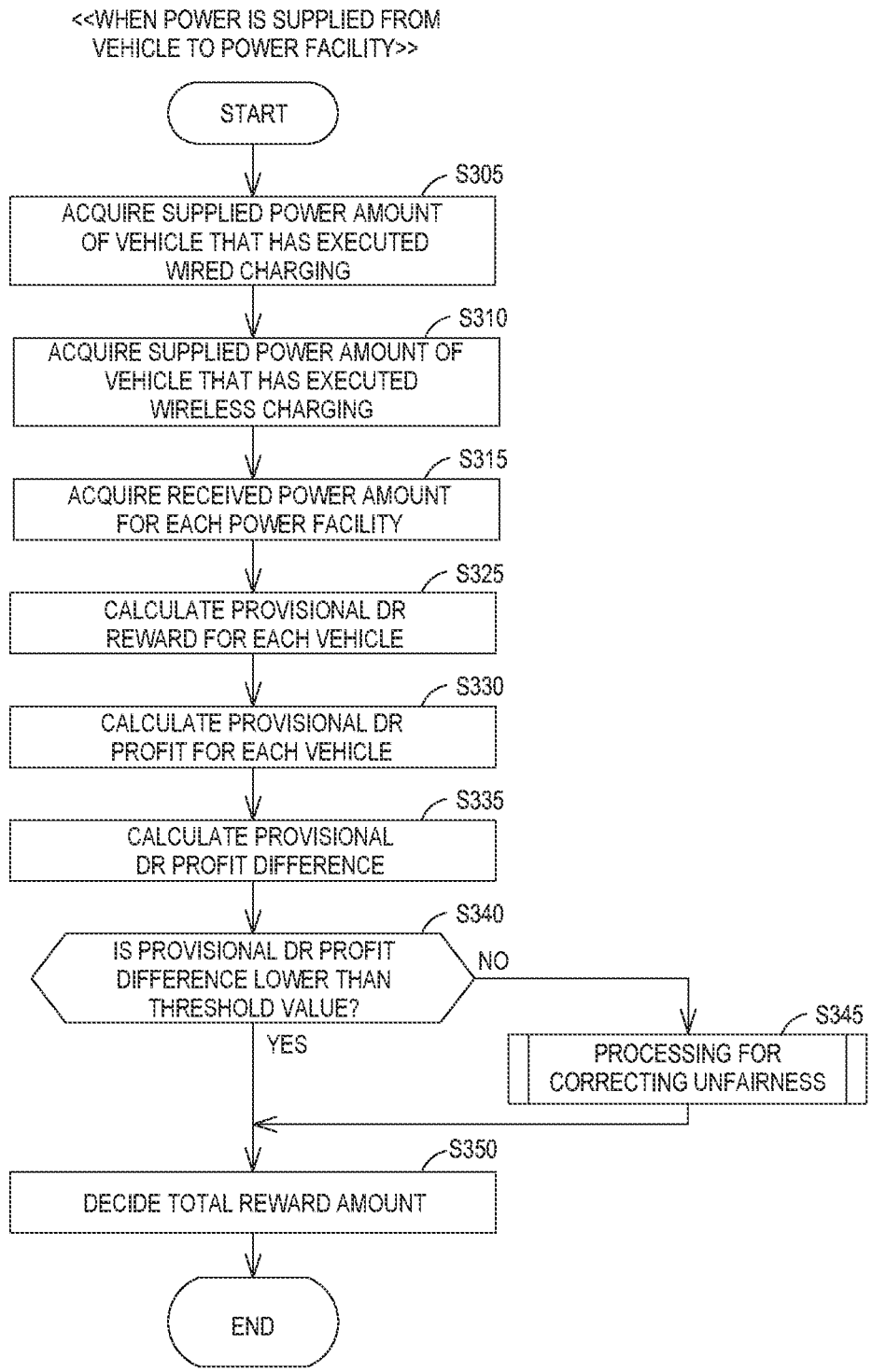
FIG. 17 is a flowchart illustrating an example of processing executed by the processing device after the target DR period is ended in a second embodiment.

FIG. 17 is a flowchart illustrating an example of processing executed by the processing device 605 after the target DR period is ended in the second embodiment. The flowchart is executed when the power demand in the power system PG is larger than the power supply.

With reference to FIG. 17, the processing device 605 acquires, from the vehicle 50A, through the communication device 630, the power amount transmitted from the vehicle 50A that has executed the wired power supply for the DR to the power stand 40 (step S305). The power amount is calculated by the ECU 150 of the vehicle 50A according to the voltage sensor 121 and the current sensor 122 of the vehicle 50A.

Next, the processing device 605 acquires, from the vehicle 50B, through the communication device 630, the power amount transmitted from the vehicle 50B that has executed the wireless power supply for the DR to the power facility 45 (step S310). The power amount is calculated by the ECU 150 of the vehicle 50B according to the voltage sensor 141 and the current sensor 142 of the vehicle 50B.

Next, the processing device 605 acquires the received power amount for each power facility used for the DR (in this example, the received power amount of the power stand 40 and the power facility 45) (step S315).

Next, the processing device 605 calculates the provisional DR reward for each vehicle 50 (step S325). In this example, the processing device 605 calculates the provisional first reward for the vehicle 50A and the provisional second reward for the vehicle 50B. The provisional first reward depends on the received power amount of the power stand 40 and the DR reward unit price UPRR1 of the vehicle 50A. The provisional second reward depends on the received power amount of the power facility 45 and the DR reward unit price UPRR2 of the vehicle 50B. At this stage, the DR reward unit prices UPRR1, UPRR2 are equal to each other.

Next, the processing device 605 calculates the provisional DR profit for each vehicle 50 (step S330). In this example, the processing device 605 calculates the provisional DR profit (the provisional first profit) of the vehicle 50A and the provisional DR profit (the provisional second profit) of the vehicle 50B. The provisional first profit is a value obtained by subtracting a value obtained by multiplying the decreased amount of the power of the battery 130A by the power cost unit price UPRP from the provisional first reward. The provisional second profit is a value obtained by subtracting a value obtained by multiplying the decreased amount of the power of the battery 130B by the power cost unit price UPRP from the provisional second reward.

Next, the processing device 605 calculates the provisional DR profit difference by calculating the difference between the provisional first profit and the provisional second profit (step S335).

Next, the processing device 605 determines whether the provisional DR profit difference is equal to or higher than the threshold value TH (step S340). When the provisional DR profit difference is lower than the threshold value TH (NO in step S340), the processing device 605 proceeds to a process of step S350.

On the other hand, when the provisional DR profit difference is equal to or higher than the threshold value TH (YES in step S340), the processing device 605 executes the processing for correcting the unfairness between the vehicles 50A and 50B (step S345). This processing is the same as that of FIG. 11 or FIG. 16. For example, the DR rewards RWA, RWB are decided such that the difference ΔP (FIG. 6) between the DR profits PA and PB is lower than the threshold value TH.

Next, the processing device 605 decides the total reward amount TRA according to decision results of the DR rewards RWA, RWB (step S350).

A server according to one aspect of the present disclosure is a server of an aggregator configured to request a plurality of vehicles to participate in a demand response (DR). Each of the vehicles is equipped with a power accumulation device and configured to be electrically connectable to a power system. The server includes a communication device and a processor. The communication device is configured to acquire a transmitted power amount that is transmitted from a power facility during external charging of a vehicle participating in the DR. The processor is configured to calculate, when the vehicles configured to participate in the DR by executing the external charging participate in the DR, a standard reward that is a standard of a reward given from the aggregator to each of the vehicles, according to the transmitted power amount, to decide, when a first vehicle from among the vehicles participates in the DR, a first reward that is a reward given from the aggregator to the first vehicle, such that the first reward becomes the standard reward for the first vehicle, and to decide, when a second vehicle from among the vehicles participates in the DR, a second reward that is a reward given from the aggregator to the second vehicle, such that the second reward becomes higher than a standard reward for the second vehicle. The external charging is charging of the power accumulation device using power from the power facility connected to the power system. The first vehicle is configured to execute wired charging that is the external charging using power received via a power cable of a first power facility as the power facility. The second vehicle is configured to execute wireless charging that is the external charging using power received from a second power facility as a power facility in a wireless manner.

A power loss amount during the wireless charging is larger than a power loss amount during the wired charging. For this reason, a power amount accumulated in the power accumulation device of the second vehicle due to the DR may be smaller than a power amount accumulated in the power accumulation device of the first vehicle. For this reason, the second vehicle may suffer a disadvantage as compared with the first vehicle. With the above configuration, since the reward (the first reward) of the first vehicle is the standard reward whereas the reward (the second reward) of the second vehicle is higher than the standard reward, the second vehicle can benefit more than the first vehicle in terms of a reward. For this reason, it is possible to contribute to an adjustment of a power supply and demand balance by restricting the number of vehicles participating in the DR due to the wireless charging from being decreased.

In the above aspect, the processor may be configured to decide the first reward according to a first transmitted power amount that is a transmitted power amount for the first vehicle, and a first unit price that is a unit price of the first reward for the first transmitted power amount, and decide the second reward according to a second transmitted power amount that is a transmitted power amount for the second vehicle, and a second unit price that is a unit price of the second reward for the second transmitted power amount. The second unit price may be higher than the first unit price.

With the above configuration, the second unit price and the first unit price are decided such that the second unit price is higher than the first unit price. As such, it is possible to improve a situation where the second vehicle suffers a disadvantage as compared with the first vehicle.

In the above aspect, the processor may be configured to calculate a first power cost that is a power cost of the first vehicle in the DR, according to a power rate unit price of the power system and the first transmitted power amount, calculate a second power cost that is a power cost of the second vehicle in the DR, according to the power rate unit price and the second transmitted power amount, calculate a first profit that is a profit obtained when the first vehicle participates in the DR, by subtracting the first power cost from the first reward, calculate a second profit that is a profit obtained when the second vehicle participates in the DR, by subtracting the second power cost from the second reward, and decide the first reward and the second reward such that a difference between the first profit and the second profit becomes lower than a threshold value.

With the above configuration, it is possible to appropriately decide the first reward and the second reward while avoiding a situation where the first profit and the second profit deviate from each other.

In the above aspect, a total reward amount that may be a sum of a reward given from the aggregator to the vehicles, may be an integrated value of a sum of the first reward for at least one first vehicle and a sum of the second reward for at least one second vehicle. The processor may be configured to decide the first reward and the second reward such that the total reward amount is maintained.

With the above configuration, it is possible for the aggregator to appropriately distribute the total reward amount to the first vehicle and the second vehicle while avoiding a situation where a power adjustment profit is decreased as the total reward amount is increased.

In the above aspect, the processor may be configured to decide, when the first vehicle and the second vehicle use paid infrastructure, the first reward and the second reward such that the second vehicle can use the paid infrastructure at a cheaper usage fee than the first vehicle.

With the above configuration, the second vehicle can benefit more than the first vehicle in terms of a usage fee of the paid infrastructure.

In the above aspect, the wireless charging may include charging during traveling that is executed while the second vehicle is traveling in a power supply lane in which the second power facility is provided. In a case where the second vehicle participates in the DR by executing the charging during traveling, the processor may be configured to execute processing for sending a notification to a user of the second vehicle, when a start time of a period in which the second vehicle participates in the DR arrives. The notification may include a notification prompting the user of the second vehicle such that the second vehicle travels in the power supply lane when the second vehicle is traveling in a traveling lane different from the power supply lane at the start time.

With the above configuration, when the second vehicle executes the charging during traveling, it is possible for the aggregator to enable the second vehicle to reliably participate in the DR.

In the above aspect, each of the vehicles may be configured to participate in the DR by executing an external power supply for supplying power accumulated in the power accumulation device to the power facility. The first vehicle may be configured to execute a wired power supply that is the external power supply for supplying power to the first power facility via the power cable. The second vehicle may be configured to execute a wireless power supply that is the external power supply for supplying power to the second power facility in a wireless manner. The communication device may be configured to acquire a received power amount received by the power facility during the external power supply of the vehicle participating in the DR. The processor may be configured to calculate, when each of the vehicles participates in the DR, the standard reward according to the received power amount, decide, when the first vehicle participates in the DR, the first reward that is calculated according to the received power amount of the first power facility, such that the first reward becomes the standard reward for the first vehicle, and decide, when the second vehicle participates in the DR, the second reward that is calculated according to the received power amount of the second power facility, such that the second reward becomes higher than the standard reward for the second vehicle.

A power loss amount during the wireless charging is larger than a power loss amount during the wired charging. For this reason, the received power amount of the second power facility due to the DR may be smaller than the received power amount of the first power facility. For this reason, the reward for the second vehicle may be smaller than the reward for the first vehicle, and the second vehicle may suffer a disadvantage as compared with the first vehicle. With the above configuration, even when the first vehicle and the second vehicle participate in the DR by the external power supply, the reward (the first reward) for the first vehicle is the standard reward whereas the reward (the second reward) for the second vehicle is higher than the standard reward. Therefore, the second vehicle can benefit more than the first vehicle in terms of the reward.

The embodiments disclosed in the present disclosure should be considered as illustrative in all points, and not be considered as limited. The scope of the present disclosure is shown by the claims, not by the above description, and is intended to include meanings equivalent to the claims and all modifications within the scope thereof.

What is claimed is:

1. A server of an aggregator configured to request a plurality of vehicles to participate in a demand response (DR), each of the vehicles being equipped with a power accumulation device and configured to be electrically connectable to a power system, the server comprising:
  a communication device configured to acquire a transmitted power amount that is transmitted from a power facility during external charging of a vehicle participating in the DR, the external charging being charging of the power accumulation device using power from the power facility connected to the power system; and a processor configured to:
calculate, when the vehicles configured to participate in the DR by executing the external charging participate in the DR, a standard reward that is a standard of a reward given from the aggregator to each of the vehicles, according to the transmitted power amount;

decide, when a first vehicle from among the vehicles participates in the DR, a first reward that is a reward given from the aggregator to the first vehicle, such that the first reward becomes the standard reward for the first vehicle; and decide, when a second vehicle from among the vehicles participates in the DR, a second reward that is a reward given from the aggregator to the second vehicle, such that the second reward becomes higher than the standard reward for the second vehicle, wherein:

the first vehicle is configured to execute wired charging that is the external charging using power received via a power cable of a first power facility as the power facility; and the second vehicle is configured to execute wireless charging that is the external charging using power received from a second power facility as the power facility in a wireless manner.

2. The server according to claim 1, wherein the processor is configured to:
decide the first reward according to a first transmitted power amount that is a transmitted power amount for the first vehicle, and a first unit price that is a unit price of the first reward for the first transmitted power amount; and
decide the second reward according to a second transmitted power amount that is a transmitted power amount for the second vehicle, and a second unit price that is a unit price of the second reward for the second transmitted power amount, the second unit price being higher than the first unit price.

3. The server according to claim 2, wherein the processor is configured to:
calculate a first power cost that is a power cost of the first vehicle in the DR, according to a power rate unit price of the power system and the first transmitted power amount;
calculate a second power cost that is a power cost of the second vehicle in the DR, according to the power rate unit price and the second transmitted power amount;
calculate a first profit that is a profit obtained when the first vehicle participates in the DR, by subtracting the first power cost from the first reward;
calculate a second profit that is a profit obtained when the second vehicle participates in the DR, by subtracting the second power cost from the second reward; and
decide the first reward and the second reward such that a difference between the first profit and the second profit becomes lower than a threshold value.

4. The server according to claim 1, wherein:
a total reward amount that is a sum of a reward given from the aggregator to the vehicles, is an integrated value of a sum of the first reward for at least one first vehicle and a sum of the second reward for at least one second vehicle; and
the processor is configured to decide the first reward and the second reward such that the total reward amount is maintained.

5. The server according to claim 1, wherein the processor is configured to, when the first vehicle and the second vehicle use paid infrastructure, decide the first reward and the second reward such that the second vehicle uses the paid infrastructure at a cheaper usage fee than the first vehicle.

6. The server according to claim 1, wherein:
the wireless charging includes charging during traveling that is executed while the second vehicle is traveling in a power supply lane in which the second power facility is provided;
the processor is configured to, in a case where the second vehicle participates in the DR by executing the charging during traveling, execute processing for sending a notification to a user of the second vehicle when a start time of a period in which the second vehicle participates in the DR arrives; and
the notification includes a notification prompting the user of the second vehicle such that the second vehicle travels in the power supply lane when the second vehicle is traveling in a traveling lane different from the power supply lane at the start time.

7. The server according to claim 1, wherein:
each of the vehicles is configured to participate in the DR by executing an external power supply for supplying power accumulated in the power accumulation device to the power facility;
the first vehicle is configured to execute a wired power supply that is the external power supply for supplying power to the first power facility via the power cable;
the second vehicle is configured to execute a wireless power supply that is the external power supply for supplying power to the second power facility in the wireless manner;
the communication device is configured to acquire a received power amount received by the power facility during the external power supply of the vehicle participating in the DR; and
the processor is configured to:
calculate, when each of the vehicles participates in the DR, the standard reward according to the received power amount;
decide, when the first vehicle participates in the DR, the first reward that is calculated according to the received power amount of the first power facility, such that the first reward becomes the standard reward for the first vehicle; and
decide, when the second vehicle participates in the DR, the second reward that is calculated according to the received power amount of the second power facility, such that the second reward becomes higher than the standard reward for the second vehicle.

* * * * *